US011032550B2

(12) United States Patent
Ye et al.

(10) Patent No.: US 11,032,550 B2
(45) Date of Patent: Jun. 8, 2021

(54) METHOD AND APPARATUS OF VIDEO CODING

(71) Applicant: MEDIATEK INC., Hsinchu (TW)

(72) Inventors: Jing Ye, San Jose, CA (US); Shan Liu, San Jose, CA (US); Shaw-Min Lei, Zhubei (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 15/440,085

(22) Filed: Feb. 23, 2017

(65) Prior Publication Data

US 2017/0251213 A1 Aug. 31, 2017

Related U.S. Application Data

(60) Provisional application No. 62/299,578, filed on Feb. 25, 2016, provisional application No. 62/371,251, filed on Aug. 5, 2016.

(51) Int. Cl.
| | |
|---|---|
| *H04N 19/159* | (2014.01) |
| *H04N 19/105* | (2014.01) |
| *H04N 19/176* | (2014.01) |
| *H04N 19/513* | (2014.01) |

(52) U.S. Cl.
CPC ......... *H04N 19/159* (2014.11); *H04N 19/105* (2014.11); *H04N 19/176* (2014.11); *H04N 19/513* (2014.11)

(58) Field of Classification Search
CPC .. H04N 19/105; H04N 19/159; H04N 19/176; H04N 19/513
See application file for complete search history.

(56) References Cited

U.S. PATENT DOCUMENTS

| | | | | |
|---|---|---|---|---|
| 7,466,774 | B2 * | 12/2008 | Boyce | H04N 19/105 375/240.13 |
| 8,457,200 | B2 * | 6/2013 | Andersson | H04N 19/105 375/240.12 |
| 9,531,990 | B1 * | 12/2016 | Wilkins | H04N 7/00 |
| 9,609,343 | B1 * | 3/2017 | Chen | H04N 19/107 |
| 9,787,982 | B2 * | 10/2017 | Wang | H04N 19/176 |
| 9,906,786 | B2 * | 2/2018 | Seregin | H04N 19/105 |
| 2006/0153297 | A1 * | 7/2006 | Boyce | H04N 19/105 375/240.16 |

(Continued)

*Primary Examiner* — Boubacar Abdou Tchoussou

(74) *Attorney, Agent, or Firm* — Oblon, McClelland, Maier & Neustadt, L.L.P.

(57) ABSTRACT

In one example, a method for video coding includes receiving input data associated with a current block in an image frame, generating an inter predictor of the current block, and generating an intra predictor of the current block based on samples of neighboring pixels and an intra prediction mode that locates the samples of neighboring pixels. The method further includes generating a final predictor of the current block by combining the inter predictor and the intra predictor according to one or more intra weight coefficients associated with the intra prediction mode, and encoding or decoding the current block based on the final predictor to output encoded video data or a decoded block. The one or more intra weight coefficients indicate one or more ratios that corresponding one or more portions of the intra predictor are combined with the inter predictor, respectively.

13 Claims, 12 Drawing Sheets

(56) References Cited

U.S. PATENT DOCUMENTS

| | | | | |
|---|---|---|---|---|
| 2007/0098067 | A1* | 5/2007 | Kim | H04N 19/176 375/240.08 |
| 2009/0257492 | A1* | 10/2009 | Andersson | H04N 19/105 375/240.12 |
| 2010/0118943 | A1* | 5/2010 | Shiodera | H04N 19/105 375/240.12 |
| 2013/0051467 | A1* | 2/2013 | Zhou | H04N 19/105 375/240.13 |
| 2013/0070855 | A1* | 3/2013 | Zheng | H04N 19/105 375/240.16 |
| 2013/0136175 | A1* | 5/2013 | Wang | H04N 19/176 375/240.12 |
| 2014/0072041 | A1* | 3/2014 | Seregin | H04N 19/105 375/240.13 |
| 2014/0140408 | A1* | 5/2014 | Lee | H04N 19/00587 375/240.16 |
| 2014/0153647 | A1* | 6/2014 | Nakamura | H04N 19/52 375/240.14 |
| 2015/0334389 | A1* | 11/2015 | Sato | H04N 19/103 375/240.16 |
| 2016/0269737 | A1* | 9/2016 | Sakakibara | H04N 19/436 |
| 2016/0323573 | A1* | 11/2016 | Ikai | H04N 19/597 |
| 2017/0150176 | A1* | 5/2017 | Zhang | H04N 19/119 |
| 2018/0041762 | A1* | 2/2018 | Ikai | H04N 19/597 |
| 2018/0249156 | A1* | 8/2018 | Heo | H04N 19/70 |
| 2018/0288410 | A1* | 10/2018 | Park | H04N 19/107 |
| 2018/0359470 | A1* | 12/2018 | Lee | H04N 19/139 |
| 2019/0037213 | A1* | 1/2019 | Hermansson | H04N 19/157 |

* cited by examiner

METHOD AND APPARATUS OF VIDEO CODING

INCORPORATION BY REFERENCE

This present disclosure claims the benefit of U.S. Provisional Application No. 62/299,578, "Methods and Apparatus of intra-inter mode in Video and Image Compression" filed on Feb. 25, 2016 and U.S. Provisional Application No. 62/371,251, "Methods for QTBT intra chroma coding and intra inter-mode in image and video compression" filed on Aug. 5, 2016, which are incorporated herein by reference in their entireties.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Many video coding standards include dividing an image frame of an input video into one or more coding units. In general, a coding unit may include a prediction unit that has a luma prediction block and at least two corresponding chroma prediction blocks. When encoding an original image of a block, the original image of the block can be divided into a predictable portion (also referred to as a predictor) and a residual portion of the block according to a predetermined video coding standard. When decoding the block, a reconstructed image of the block can be obtained by generating and combining the predictor and the residual portion of the block according to the same predetermined video coding standard.

In some applications, the predictor of a block can be generated based on the image(s) of other blocks and/or other frames. Such prediction scheme aims at reducing temporal redundancy in the encoded video data and is also known as an inter prediction. In some applications, the predictor of a block can be generated by extrapolating samples of neighboring pixels adjacent to the block based on a selected one of plural predetermined prediction modes. Such prediction scheme can reduce spatial redundancy in the encoded video data and is also known as an intra prediction.

SUMMARY

Aspects of the disclosure provide a method for video coding. The method can include receiving input data associated with a current block in an image frame, generating an inter predictor of the current block, and generating an intra predictor of the current block based on samples of neighboring pixels and an intra prediction mode that locates the samples of neighboring pixels. The method can further include generating a final predictor of the current block by combining the inter predictor and the intra predictor according to one or more intra weight coefficients associated with the intra prediction mode, and encoding or decoding the current block based on the final predictor to output encoded video data or a decoded block. The one or more intra weight coefficients indicate one or more ratios that corresponding one or more portions of the intra predictor can be combined with the inter predictor, respectively.

In an embodiment, combining the inter predictor and the intra predictor is performed according to an intra weight coefficient applicable to an entirety of the current block when the intra prediction mode is a non-angular prediction mode.

In an embodiment, the method further includes dividing the current block into a predetermined number of portions when the intra prediction mode is an angular prediction mode. Combining the inter predictor and the intra predictor may be performed according to intra weight coefficients for the predetermined number of portions, respectively. Also, values of the intra weight coefficients increase when distances between the corresponding portions and the samples of neighboring pixels along a direction of reference of the intra prediction mode decrease.

In an embodiment, the method further includes identifying a closest one of predetermined representative directions to a direction of reference of the intra prediction mode when the intra prediction mode is an angular prediction mode, and dividing the current block into a predetermined number of portions arranged along the identified representative direction. Combining the inter predictor and the intra predictor is performed according to intra weight coefficients for the predetermined number of portions, respectively. Also, values of the intra weight coefficients increase when distances between the corresponding portions and the samples of neighboring pixels along the identified representative direction decrease. Moreover, the predetermined representative directions may include at least a vertical direction of reference and a horizontal direction of reference.

The method may further include selecting the intra prediction mode for the current block from a first plurality of predetermined intra prediction modes, and encoding or decoding a second block based on an intra predictor derived according to a second intra prediction mode selected from a second plurality of predetermined intra prediction modes. The first plurality of predetermined intra prediction modes may be a subset of the second plurality of predetermined intra prediction modes.

In one embodiment, the first plurality of predetermined intra prediction modes includes at least most probable modes (MPMs) selected from the second plurality of predetermined intra prediction modes. In one embodiment, when the current block is a chroma block, the first plurality of predetermined intra prediction modes includes one or more of the direct mode, linear mode, DC mode, planar mode, horizontal mode, and/or vertical mode.

A number of the first plurality of predetermined intra prediction modes may be determinable based on a size of the current block. Moreover, the first plurality of predetermined intra prediction modes may exclude a first portion of angular prediction modes of the second plurality of predetermined intra prediction modes that have directions of reference pointing to a left edge of the current block when a width of the current block is greater than a height of the current block. Also, the first plurality of predetermined intra prediction modes may exclude a second portion of angular prediction modes of the second plurality of predetermined intra prediction modes that have directions of reference pointing to an upper edge of the current block when the width of the current block is less than the height of the current block.

The method may further includes including in a Sequence Parameter Set (SPS) or a Picture Parameter Set (PPS) of the encoded video data or extracting from the SPS or the PPS of the input data, an enable flag indicating whether a functionality of encoding or decoding a block using a final predictor generated based on combining an inter predictor and an intra predictor is enabled for a corresponding sequence or picture(s).

In one embodiment, a flag indicating whether the current block is encoded using the final predictor generated based on combining the inter predictor and the intra predictor in the encoded video data is included in the encoded video data or extracted from the input data only if the current block is identified in the encoded video data or is identified in the input data by another flag as encoded using inter prediction. In one embodiment, a flag indicating whether the current block is encoded using the final predictor generated based on combining the inter predictor and the intra predictor in the encoded video data is included in the encoded video data or extracted from the input data only if the current block is identified in the encoded video data or is identified in the input data by another flag as encoded using intra prediction.

Additionally, in an embodiment, the inter predictor may be generated by deriving a motion vector using an Advanced Motion Vector Prediction (AMVP), Merge, or Skip mode.

Aspects of the disclosure can further provide a video coding apparatus that includes a processing circuit configured to receive input data associated with a current block in an image frame, generate an inter predictor of the current block, and generate an intra predictor of the current block based on samples of neighboring pixels and an intra prediction mode that locates the samples of neighboring pixels. The processing circuit may be further configured to generate a final predictor of the current block by combining the inter predictor and the intra predictor according to one or more intra weight coefficients associated with the intra prediction mode, and encode or decode the current block based on the final predictor to output encoded video data or a decoded block. The one or more intra weight coefficients may indicate one or more ratios that corresponding one or more portions of the intra predictor are combined with the inter predictor, respectively.

In an embodiment, the processing circuit may be configured to perform combining the inter predictor and the intra predictor according to an intra weight coefficient applicable to an entirety of the current block when the intra prediction mode is a non-angular prediction mode.

Moreover, the processing circuit may be configured to divide the current block into a predetermined number of portions when the intra prediction mode is an angular prediction mode, and perform combining the inter predictor and the intra predictor according to intra weight coefficients for the predetermined number of portions, respectively. Values of the intra weight coefficients may increase when distances between the corresponding portions and the samples of neighboring pixels along a direction of reference of the intra prediction mode decrease.

Aspects of the disclosure further provide a non-transitory computer readable medium storing program instructions for causing a processing circuit of an apparatus to perform a video coding method. The method may include receiving input data associated with a current block in an image frame, generating an inter predictor of the current block, and generating an intra predictor of the current block based on samples of neighboring pixels and an intra prediction mode that locates the samples of neighboring pixels. The method may further include generating a final predictor of the current block by combining the inter predictor and the intra predictor according to one or more intra weight coefficients associated with the intra prediction mode, and encoding or decoding the current block based on the final predictor to output encoded video data or a decoded block. The one or more intra weight coefficients may indicate one or more ratios that corresponding one or more portions of the intra predictor are combined with the inter predictor, respectively.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
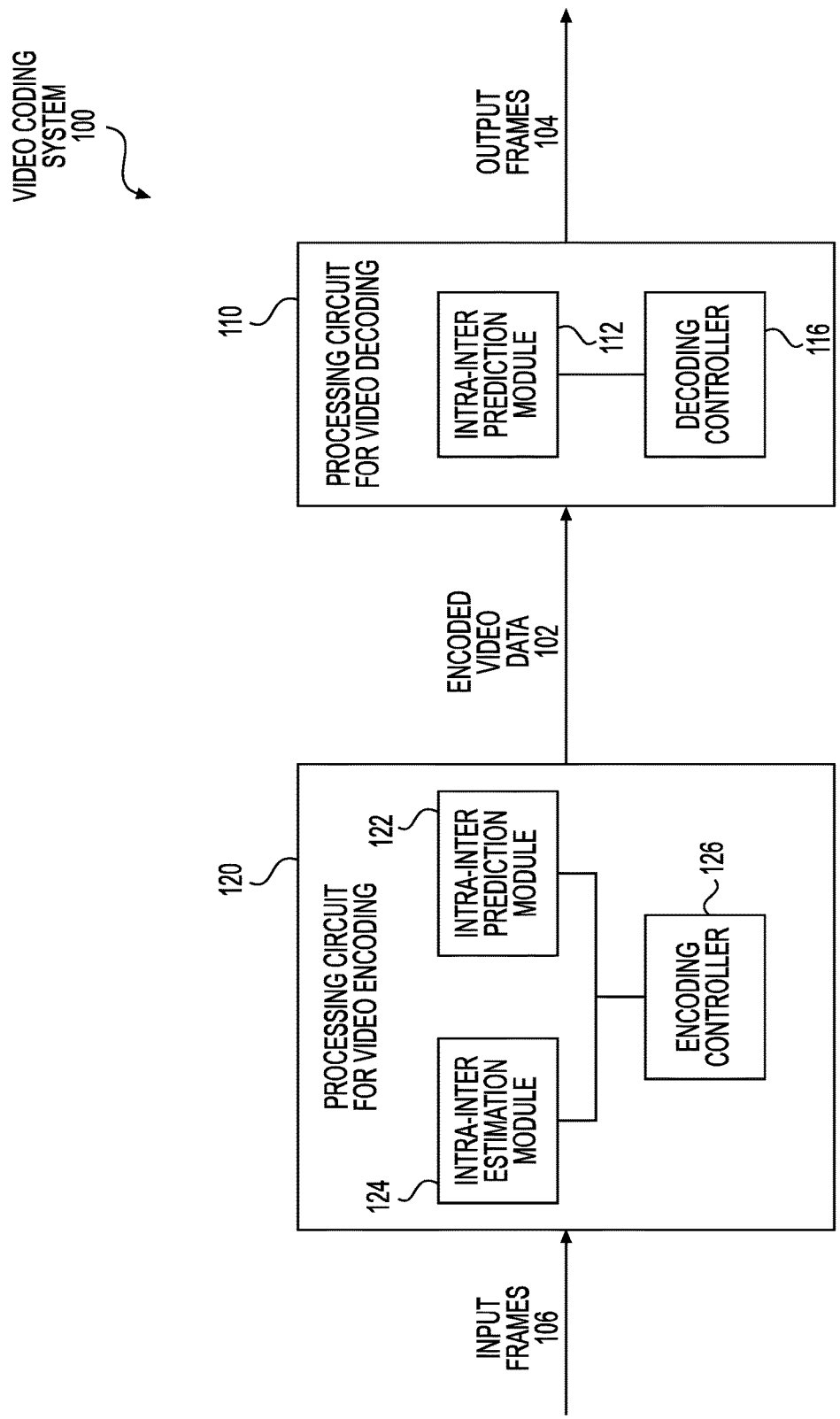
FIG. 1 shows an exemplary functional block diagram of a video coding system according to an embodiment of the disclosure.

FIG. 1 shows an exemplary functional block diagram of a video coding system 100 according to an embodiment of the disclosure. The video coding system 100 includes a processing circuit for video decoding (i.e., a decoding circuit) 110 and a processing circuit for video encoding (i.e., an encoding circuit) 120. The encoding circuit 120 receives input frames 106 as input data and generates encoded video data 102 by encoding the input frames 106. The decoding circuit 110 receives the encoded video data 102 as input data and generates output frames 104 by decoding the encoded video data 102. The video coding system 100 may be implemented by one or more video coding devices that can include the decoding circuit 110, the encoding circuit 120, or both the decoding circuit 110 and encoding circuit 120.

The decoding circuit 110 can include at least an intra-inter prediction module 112 and a decoding controller 116. The intra-inter prediction module 112 can generate a final predictor of a block to be decoded (or a current block) in an image frame using an intra-inter prediction. More specifically, the intra-inter prediction module 112, according to prediction parameters provided by the decoding controller 116, can generate an intra predictor and an inter predictor of the current block. The intra predictor may be generated based on samples of neighboring pixels adjacent to the current block and an intra prediction mode, which may be dictated by the encoded video data 102 and usable to locate the samples of neighboring pixels. The inter predictor may be generated based on a reference block that can be located using a motion vector, which may be explicitly provided in the encoded video data 102 or derived based on information provided in the encoded video data 102. Finally, the intra-inter prediction module 112 can generate the final predictor of the current block by combining the inter predictor and the intra predictor according to one or more intra weight coefficients associated with the intra prediction mode.

The one or more intra weight coefficients indicate one or more ratios that corresponding one or more portions of the intra predictor are combined with the inter predictor, respectively. The weights can be applied according to a prediction mode of the intra prediction. For example, when an intra prediction mode is a non-angular prediction mode, combining the inter predictor and the intra predictor can be performed according to an intra weight coefficient applicable to an entirety of the current block. When the intra prediction mode is an angular prediction mode, combining the inter predictor and the intra predictor can be performed according to intra weight coefficients for various predetermined portions of the current block, where the values of the intra weight coefficients may vary with distances between the corresponding portions and the samples of neighboring pixels along a direction of reference of the intra prediction mode.

The intra prediction mode for decoding the current block can be selected from a first plurality of predetermined intra prediction modes. The decoding circuit 110 may further decode a second block in the same image frame or another image frame based on an intra predictor derived according to a second intra prediction mode that is selected from a second plurality of predetermined intra prediction modes. In some examples, the first plurality of predetermined intra prediction modes for the intra-inter prediction is a subset of the second plurality of predetermined intra prediction modes for the intra prediction.

For example, when the decoding circuit 110 is used to decode a 4×4 luma block based on the International Telecommunication Union Telecommunication Standardization Sector (ITU-T) H.264 standard (also known as H.264, MPEG-4 Part 10, Advanced Video Coding, MPEG-4 AVC, or H.264/MPEG-4 AVC standard), the second plurality of predetermined intra prediction modes may include 9 different intra prediction modes consistent with the H.264 standard, including 8 different angular prediction modes and one non-angular prediction mode (e.g., a DC mode, where an average value of the neighboring samples is assigned to all pixels of the block). Under this scenario, the first plurality of predetermined intra prediction modes may include the non-angular prediction mode and a portion of the nine angular prediction modes. In another example, when the decoding circuit 110 is used to decode a 32×32 luma block based on the ITU-T H.265 standard (also known as H.265, High Efficiency Video Coding, HEVC, or H.265/HEVC standard), the second plurality of predetermined intra prediction modes may include 35 different intra prediction modes consistent with the H.265 standard, including 33 different angular prediction modes and two non-angular prediction modes (e.g., a DC mode as discussed above and a planar mode, where values of the pixels of the block are determined using a two-dimensional extrapolation of the neighboring samples). Under this scenario, the first plurality of predetermined intra prediction modes may include the two non-angular prediction modes and a portion of the 33 intra prediction modes. In some examples, the first plurality of predetermined intra prediction modes may include at least the most probable modes (MPMs) among the corresponding predetermined intra prediction modes, which may be selected based on neighboring blocks of the current block. Of course, the second plurality of predetermined intra prediction modes may be defined according to a predetermined video coding standard and may include a number of angular prediction modes or non-angular prediction modes different from those disclosed in the present disclosure.

The decoding controller 116 can oversee the decoding of the encoded video data 102, including determining whether to use the intra-inter prediction module 112 to decode the current block and/or controlling the operation of the intra-inter prediction module 112. In some examples, the decoding controller 116 receives the encoded video data 102 associated with the current block and extracts information therefrom regarding whether to user the intra-inter prediction module 112, the corresponding intra prediction mode, the corresponding motion vector, and/or the one or more intra weight coefficients. In some examples, some or all of the intra prediction mode, motion vector, and one or more intra weight coefficients for decoding the current block can be explicitly specified in the encoded video data 102 or derived based on the encoded video data 102 and a predetermined video coding standard.

In some examples, whether to use the intra-inter prediction may be determined based on whether the size of the current block is greater than a predetermined threshold. Moreover, the use the intra-inter prediction for the current block may be indicated by a flag, either explicitly specified in or derived from the encoded video data 102, as using the intra-inter prediction different from using an intra prediction alone or using an inter prediction alone. In some examples, the use the intra-inter prediction for the current block may be indicated as a special case of the intra prediction. In some other examples, the use the intra-inter prediction for the current block may be indicated as a special case of the inter prediction.

The encoding circuit 120 can include at least an intra-inter prediction module 122, an intra-inter estimation module 124, and an encoding controller 126. The intra-inter estimation module 124 can analyze the input frames 106 and determine prediction parameters for encoding a block (or a current block) in an image frame using an intra-inter prediction. The prediction parameters may include an intra prediction mode for generating an intra predictor of the current block, a motion vector for generating an inter predictor of the current block, and/or one or more intra weight coefficients associated with the intra prediction mode for generating a final predictor for the current block. The prediction parameters selected or identified by the intra estimation module 124 may be forwarded to the encoding controller 126, and the encoding controller 126 may determine whether to encode the current block using the intra-inter prediction and encode the prediction parameters as part of the encoded video data 102 if the current block is to be coded using the intra-inter prediction. The prediction parameters selected or identified by the intra estimation module 124 may also be forwarded to the intra-inter prediction module 122 to generate the final predictor of the current block.

The intra-inter prediction module 122 can generate the final predictor of the current block for further encoding process in a manner similar to the operation of the intra-inter prediction module 112. Moreover, the encoding controller 126 can oversee the encoding of the current block, including determining whether to use the intra-inter estimation module 124 and the intra-inter prediction module 122 to encode the current block and/or controlling the operation of the intra-inter estimation module 124 and the intra-inter prediction module 122.

The encoding circuit 120, like the decoding circuit 110, can support the first plurality of predetermined intra prediction modes for the intra-inter prediction and the second plurality of predetermined intra prediction modes for the intra prediction, where the first plurality of predetermined intra prediction modes may be a subset of the second plurality of predetermined intra prediction modes.

Figure 2:
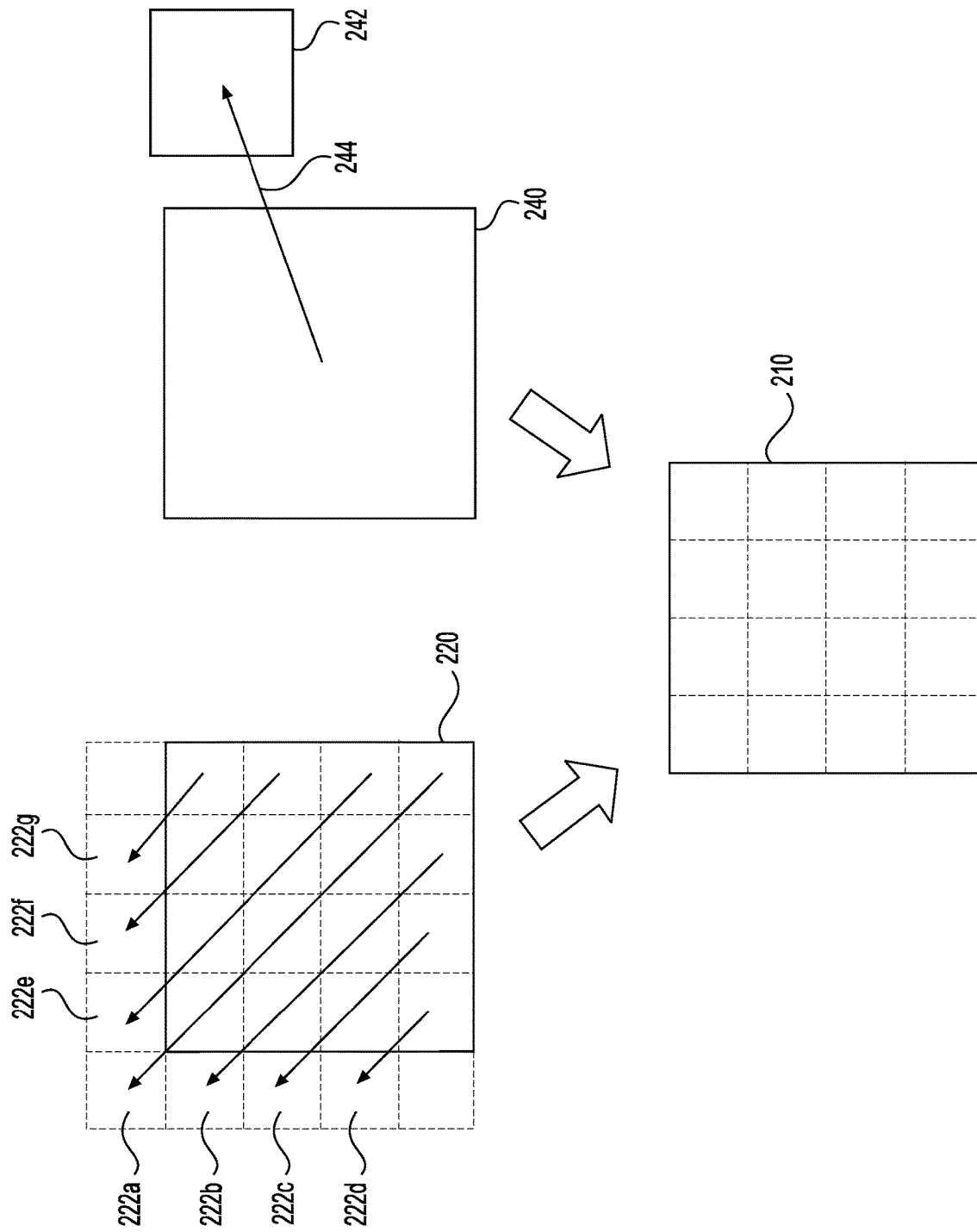
FIG. 2 shows a diagram illustrating generating a final predictor of a block using an intra-inter prediction according to an exemplary embodiment of the disclosure.

FIG. 2 shows a diagram illustrating generating a final predictor of a block using an intra-inter prediction according to an exemplary embodiment of the disclosure. The final predictor 210 of the block may be a weighted combination of an intra predictor 220 and an inter predictor 240 of the block. The intra predictor 220 may be generated based on samples of neighboring pixels 222a-222g and a specified intra prediction mode. The intra prediction mode may indicate a direction of reference pointing toward corresponding samples for each pixel of the intra predictor when the intra prediction mode is an angular prediction mode. The intra prediction mode may indicate that upper, left, or all neighboring pixels are used for generating the intra predictor when the intra prediction mode is a non-angular prediction mode. In the present disclosure, a direction of an intra prediction mode refers to the direction of reference for locating the neighboring samples. In some applications, the intra prediction mode may be identified by a direction of prediction, which is the opposite of the direction of reference. The intra prediction mode for generating the intra predictor 220 of the current block may be signaled or derived according to any applicable approach.

The inter predictor 240 may be generated based on a reference block 242 of another image frame, which can be located based on a specified motion vector 244. In some examples, the reference block 242 may be located in the same frame as the current block 240. The motion vector 244 for generating the inter predictor 240 of the current block may be signaled or derived according to any applicable approach. In some examples, the motion vector can be derived from a list of motion vector predictor (MVP) candidate(s), which can be encoded using an Advanced Motion Vector Prediction (AMVP), Merge, or Skip mode. Moreover, the inter prediction may be performed according to a normal inter mode, frame rate up-conversion mode (FRUC) mode, affine mode, merge mode, or the like. In some examples, the inter prediction part of the intra-inter prediction may be limited to a subset of the above-noted inter modes.

The final predictor 210 of the current block may be generated by combining the intra predictor 220 and the inter predictor 240 of the current block according to one or more intra weight coefficients associated with the intra prediction mode. In some examples, each intra weight coefficient indicates a ratio of a weighting assigned to a particular portion of the intra predictor 220 to a summation of the weighting assigned to the portion of the intra predictor 220 and a weighting assigned to a corresponding portion of the inter predictor 240. For example, if a value of an intra weight coefficient is 0.5, the weightings for combining corresponding portions of the intra predictor and the inter predictor are 0.5-0.5. In another example, if a value of an intra weight coefficient is 0.8, the weightings for combining corresponding portions of the intra predictor and the inter predictor are 0.8-0.2. Moreover, in some examples, provided a pixel (Pred) of the final predictor is determined based on the corresponding pixels of the intra and inter predictors (Pred_intra and Pred_inter) with the intra weight coefficient w_intra and inter weight coefficient w_inter, the pixel (Pred) of the final predictor can be determined as:

$$Pred = w\_intra * Pred\_intra + w\_inter * Pred\_inter, \text{ and}$$

$$w\_intra + w\_inter = 1.$$

Figure 3:
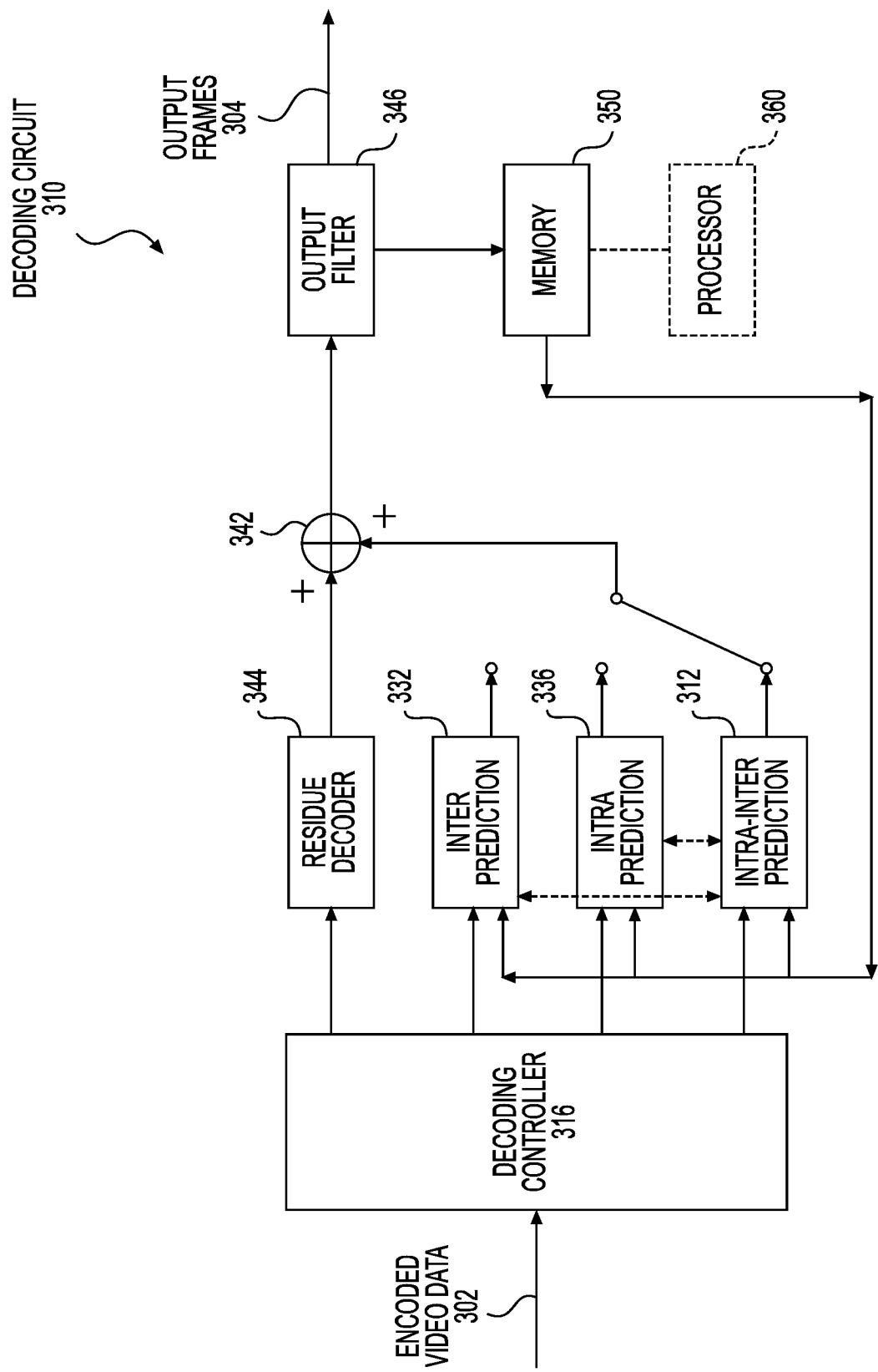
FIG. 3 shows a functional block diagram of an exemplary decoding circuit in the video coding system in FIG. 1 according to an embodiment of the disclosure.

FIG. 3 shows an exemplary functional block diagram of a decoding circuit 310 in a video coding system, such as the video coding system 100 in FIG. 1, according to an embodiment of the disclosure. FIG. 3 is a simplified illustration of the decoding circuit 310 and thus may not show all the details and variations of the decoding circuit 310.

The decoding circuit 310 includes an intra-inter prediction module 312 and a decoding controller 316 that may correspond to the intra-inter prediction module 112 and the decoding controller 116 in FIG. 1, respectively. The intra-inter prediction module 312 may generate a final predictor of a current block based on a specified intra prediction mode and a specified motion vector, should the decoding controller 316 determine that the current block is to be decode using the intra-inter prediction. The decoding circuit 310 also includes an inter prediction module 332, an intra prediction module 336, an adder 342, a residue decoder 344, an output filter 346, a memory 350, and a processor 360. The inter prediction module 332 may generate an inter predictor based on a specified motion vector as the final predictor of the current block when the current block is to be decode using the inter prediction. The intra prediction module 336 may generate an intra predictor based on a specified intra prediction mode as the final predictor of the current block when the current block is to be decode using the inter prediction.

Moreover, the residue decoder 344 can generate the residual portion of the current block according to the residue information from the decoding controller 316. The adder 342 may generate a decoded image of the current block (i.e., the decoded block) by adding the residual portion of the current block from the residue decoder 344 and the final predictor of the current block from the inter-intra prediction module 312, the inter prediction module 332, or the intra prediction module 336. The output filter 348 combines decoded blocks from the adder 342 into image frames, processes the image frames according to a predetermined filtering process, and output the filtered image frames as the output frames 304. The memory 350 can store filtered image frame from the output filter 348 and/or previously decoded blocks of a current frame from the prediction modules 312, 332, or 336, which can be further used by the prediction modules 312, 332, or 336 for retrieving reference samples.

The decoding controller 316 receives and analyzes the encoded video data 302 and extracts residue information and prediction parameters of the current block. The decoding controller 316 may provide the residue information to the residue decoder 344 and provide the prediction parameters to the intra-inter prediction module 312, the inter prediction module 332, or the intra prediction module 336 in order to reconstruct the image of the current block. In some examples, when the current block is to be decoded using the intra-inter prediction, the intra-inter prediction module 312 may instruct the inter prediction module 332 and the intra prediction module 336 to generate corresponding inter predictor and intra predictor of the current block and then combine the inter predictor and intra predictor of the current block to output the final predictor of the current block. Of course, in some other examples, the intra-inter prediction module 312 may be implemented to have a built-in inter prediction module and/or a built-in intra prediction module such that assistance from the inter prediction module 332 and/or the intra prediction module 336 may not be necessary.

In operation, when a block in an image frame (i.e., a current block) is to be decoded, the decoding controller 316 receives the encoded video data 302 associated with the current block and extracts information with respect to whether the current block is to be decoded using the inter prediction, the intra prediction, or the intra-inter prediction. When the decoding controller 316 determines that the current block is to be decoded using the intra-inter prediction, the decoding controller 316 forwards the prediction parameters of the current block to the intra-inter prediction module 312. The prediction parameters may include an intra prediction mode for generating an intra predictor of the current block and a motion information for generating an inter predictor of the current block, and/or one or more intra weight coefficients associated with the intra prediction mode for generating a final predictor for the current block. The prediction parameters selected or identified by the decoding controller 316 may be explicitly specified in the encoded video data 302 or derived based on information provided in the encoded video data 302 and a predetermined video coding standard.

The intra-inter prediction module 312 may generate the intra predictor of the current block according to samples of neighboring pixels and the intra prediction mode provided by the decoding controller 316. Alternatively, the intra-inter prediction module 312 may request the intra prediction module 336 to generate the intra predictor of the current block. Moreover, the intra-inter prediction module 312 may generate the inter predictor of the current block according to the motion information provided by the decoding controller 316. Alternatively, the intra-inter prediction module 312 may request the inter prediction module 332 to generate the inter predictor of the current block.

After the generation of the intra predictor and the inter predictor of the current block, the intra-inter prediction module 312 generates a final predictor of the current block by combining the intra predictor and the inter predictor of the current block according to one or more intra weight coefficients associated with the intra prediction mode. On the other hand, the decoding controller 316 also forwards the residue information to the residue decoder 344, where a residual portion of the current block is generated. The current block can now be decoded by adding the final predictor and the residual portion of the current block at the adder 342.

In some examples, the decoding controller 316 may extract, from the encoded video data 302, a flag indicating whether the current block is encoded using the intra-inter prediction such that the final predictor of the current block is to be generated based on combining the inter predictor and the intra predictor thereof. The flag may be provided as a syntax element at a block level in the encoded video data 302 (e.g., prediction unit (PU) level). Also, the flag may be bypass coded or context coded, using one, two or three contexts.

In some examples, when two contexts (e.g., context0 and context1) are used for the flag, the flag may use context0 when any of the above or left block uses intra-inter prediction and may use context 1 for other scenarios. In some examples, when three contexts (e.g., context0, context1, and context 2) are used for the flag, the flag may use context0 when none of the above or left block uses intra-inter prediction, may use context1 when one of the above or left block uses intra-inter prediction, and may use context2 when both the above and left block use intra-inter prediction.

The use of the intra-inter prediction may be signaled as a standalone prediction mode. In some examples, the use the intra-inter prediction for the current block may be indicated as a special case of the inter prediction. In such scenario, the decoding controller 316 may first determine if the current block is identified in the encoded video data 302 by another flag as encoded using inter prediction. When the current block is identified as encoded using the inter prediction, a flag will indicate whether the current block is encoded using intra-inter prediction, and the decoding controller 316 may extract the flag only if the current block is identified as encoded using inter prediction. In some examples, when the current block is encoded using the intra-inter prediction, the intra information will be signaled and the inter information (e.g., motion information) can be signaled or derived. In this case, the intra information is signaled after signaling the flag. Otherwise, when the current block is encoded using just the inter prediction, the intra information will not be available (i.e., no intra information is signaled) while the inter information may be signaled or derived.

In some other examples, the use the intra-inter prediction for the current block may be indicated as a special case of the intra prediction. In such scenario, the decoding controller 316 may first determine if the current block is identified in the encoded video data 302 by another flag as encoded using intra prediction. When the current block is identified as encoded using the intra prediction, a flag will indicate whether the current block is encoded using intra-inter prediction, and the decoding controller 316 may extract the flag only if the current block is identified as encoded using intra prediction. In some examples, when the current block is encoded using the intra-inter prediction, the inter information (e.g., motion information) will be signaled and the intra information can be signaled or derived. In this case, the inter information is signaled after signaling the flag. Otherwise, when the current block is encoded using just the intra prediction, the intra information can be signaled or derived while the inter information will not be available (i.e., no inter information is signaled).

In some examples, the decoding controller 316 may further extract, from a Sequence Parameter Set (SPS) or a Picture Parameter Set (PPS) of the encoded video data 302, an enable flag indicating whether the intra-inter prediction is enabled or disabled for the corresponding sequence or picture(s). When the enable flag indicates that the intra-inter prediction is enabled for the corresponding sequence or picture(s), the decoding controller 316 may check the a block level flag (e.g., PU level flag) for identifying if the corresponding block in the corresponding sequence or picture(s) that is encoded using the intra-inter prediction. When the enable flag indicates that the intra-inter prediction is disabled for the corresponding sequence or picture(s), no block in the corresponding sequence or picture(s) is encoded using the intra-inter prediction, and the decoding controller 316 may not need to check the aforementioned block level flag.

Also, for a given block size, the intra-inter prediction module 312 may support a first plurality of predetermined intra prediction modes, while the intra prediction module 336 may support a second plurality of predetermined intra prediction modes. In some examples, the first plurality of predetermined intra prediction modes may be a subset of the second plurality of predetermined intra prediction modes in order to reduce the encoding overhead. The selection of the first plurality of predetermined intra prediction modes from the second plurality of predetermined intra prediction modes may vary with a size and/or a shape of the current block. The first plurality of predetermined intra prediction modes may be most probable modes (MPMs) selected from the second plurality of predetermined intra prediction modes based on neighboring blocks of the current block. When the current block is a chroma block, the first plurality of predetermined intra prediction modes may include at least a direct mode (DM mode), which corresponds to an intra prediction mode derived from one or more luma blocks that correspond to the chroma block, or a linear mode (LM mode), which corresponds to an intra prediction mode derived from the corresponding luma block and one or more neighboring luma blocks and/or neighboring chroma blocks. In some examples, when the current block is a chroma block, the first plurality of predetermined intra prediction modes may include one or more of the direct mode, linear mode, DC mode, planar mode, horizontal mode that corresponds to a horizontal direction of reference, and/or vertical mode that corresponds to a vertical direction of reference.

The intra weight coefficient(s) for the intra-inter prediction are associated with the intra prediction mode, and thus may be determined based on the intra prediction mode. In some examples, combining the inter predictor and the intra predictor may be performed according to an intra weight coefficient applicable to an entirety of the current block when the intra prediction mode is a non-angular prediction mode, such as a DC mode or a planar mode. In some examples, the current block may be divided into a predetermined number of portions when the intra prediction mode is an angular prediction mode. Combining the inter predictor and the intra predictor may be performed according to intra weight coefficients for the predetermined number of portions, respectively. In some examples, values of the intra weight coefficients may increase when distances between the corresponding portions of the current block and the samples of neighboring pixels along a direction of reference of the intra prediction mode decrease.

Of course, some or all of the motion information, the intra prediction mode, and the weight coefficient(s) for decoding the current block can be explicitly specified in the encoded video data.

Moreover, as shown in FIG. 3, the processor 360 is electrically coupled with the memory 350 and can be configured to execute program instructions stored in the memory 350 to perform various functions. The processor 360 can include a single or multiple processing cores. Various components of the decoding circuit 310, such as the decoding controller 316, intra-inter prediction module 312, inter prediction module 332, intra prediction module 336, adder 342, residue decoder 344, and/or output filter 346, may be implemented by hardware components, the processor 360 executing the program instructions, or a combination thereof. Of course, the processor 360 can also execute program instructions to control receiving of the encoded video data 302 and the output or display of the output frames 304. In some examples, the processor 360 can execute program instructions to perform functions that may not be directly related to decoding the encoded video data 302.

The memory 350 can be used to store the program instructions, information corresponding to the prediction parameters, previously decoded blocks, output frames, and/or intermediate data for performing various functions of the decoding circuit 310. In some examples, the memory 350 includes a non-transitory computer readable medium, such as a semiconductor or solid-state memory, a random access memory (RAM), a read-only memory (ROM), a hard disk, an optical disk, or other suitable storage medium. In some embodiments, the memory 350 includes a combination of two or more of the non-transitory computer readable mediums listed above.

Figure 4B:
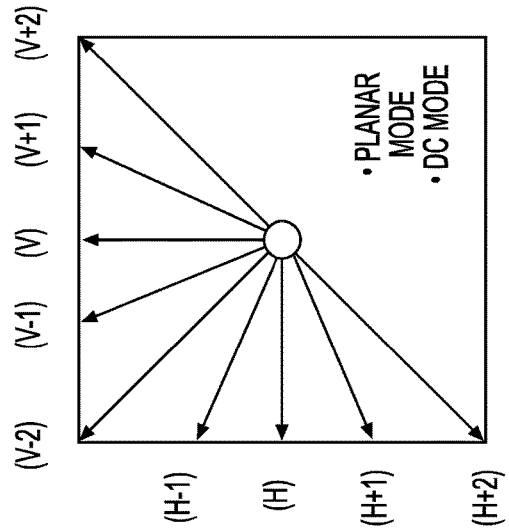
FIGS. 4A-4C show diagrams illustrating example sets of available intra prediction modes for an intra-inter prediction according to an exemplary embodiment of the disclosure.
Figure 4A:
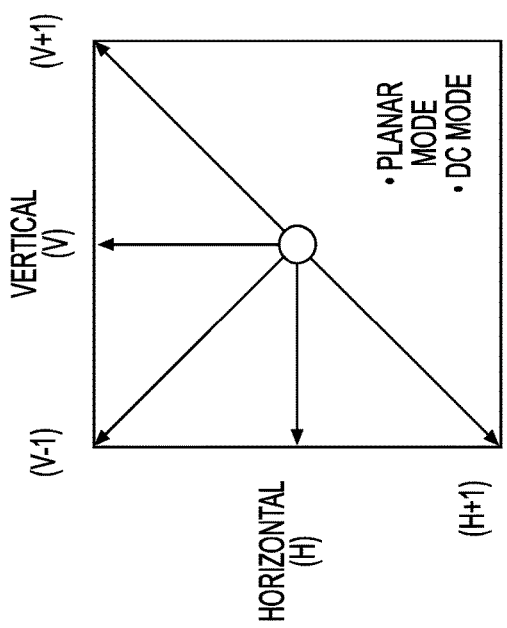

FIG. 4A shows a diagram illustrating an exemplary set of available intra prediction modes for an intra-inter prediction according to an embodiment of the disclosure. The available intra prediction modes may include two non-angular prediction modes and five angular prediction modes. The available non-angular prediction modes may include a planar mode and a DC mode. The directions of reference of the available angular prediction modes may include a vertical direction (V), indicating that suitable samples can be located adjacent to an upper side of the current block, and a horizontal direction (H), indicating that suitable samples can be located adjacent to a left side of the current block. The directions of reference of the available angular prediction modes may further include a vertical diagonal direction (V+1) that corresponds to a 45-degree clockwise rotation to the vertical direction, a diagonal direction (V−1) that corresponds to a 45-degree counterclockwise rotation to the vertical direction, and a horizontal diagonal direction (H+1) that corresponds to a 45-degree counterclockwise rotation to the horizontal direction.

There may be many different ways to signal these seven intra prediction modes. In one example, the non-angular modes can be signaled using less bins, and the angular modes can be signaled using more bins. Table 1 shows a bin assignment according to this approach, where various angular modes are identified based on the corresponding direction of reference.

TABLE 1

| Intra mode | Bin string |
| --- | --- |
| DC mode | 10 |
| Planar mode | 11 |
| Mode H + 1 | 00 |
| Mode H | 0100 |
| Mode V − 1 | 0101 |
| Mode V | 0110 |
| Mode V + 1 | 0111 |

In another example, the signaling of the intra prediction modes can be arranged based on statistic, where a more frequently used mode may be signaled using less bins, and a less frequently used mode may be signaled using more bins. For example, the horizontal mode (Mode H) and vertical mode (Mode V) can use less bins and other mode can have more bins. Table 2 shows a bin assignment according to this approach.

TABLE 2

| Intra mode, in a descending order of frequency of usage | Bin string |
| --- | --- |
| Mode H | 10 |
| Mode V | 11 |
| Planar mode | 00 |
| DC mode | 0100 |
| Mode H + 1 | 0101 |
| Mode V − 1 | 0110 |
| Mode V + 1 | 0111 |

In addition, the bins illustrated with reference to Table 1 and Table 2 can be context coded or bypass coded. Also, the intra prediction modes for the intra-inter prediction may be a subset of available intra prediction modes for the intra prediction. For example, while the intra-inter prediction uses seven different intra prediction modes, the intra prediction may use 35 intra prediction modes according to the H.265/HEVC standard, which include the seven intra prediction modes for the intra-inter prediction and 28 additional angular prediction modes with directions of reference spread between direction (V+1) and direction (H+1). In another example, the intra prediction may use 67 intra prediction modes, which include the seven intra prediction modes for the intra-inter prediction and 60 additional angular prediction mode with directions of reference spread between direction (V+1) and direction (H+1).

FIG. 4B shows a diagram illustrating another exemplary set of available intra prediction modes for an intra-inter prediction according to an embodiment of the disclosure. The available intra prediction modes may include two non-angular prediction modes and nine angular prediction modes. The available non-angular prediction modes may include a planar mode and a DC mode. The directions of reference of the available angular prediction modes may include the vertical direction (V), the horizontal direction (H), and directions (V−2), (V−1), (V+1), (V+2), (H−1), (H+1), and (H+2), where adjacent directions are separated by 22.5 degrees. The signaling of a selected intra prediction mode may be arranged similar to those illustrated with reference to Table 1 and Table 2. Also, the intra prediction modes for the intra-inter prediction may be a subset of available intra prediction modes for the intra prediction.

Figure 4C:
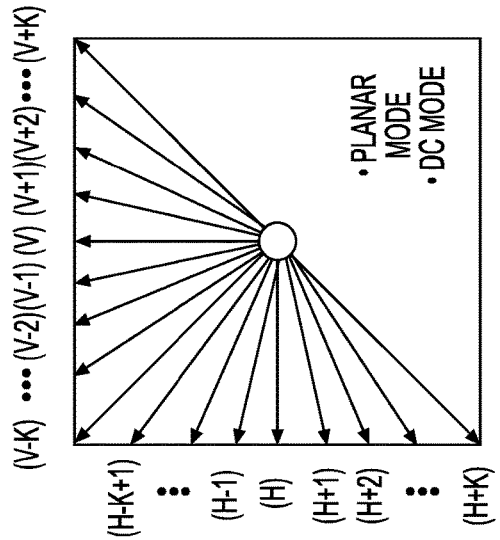

FIG. 4C shows a diagram illustrating a generalized example of available intra prediction modes for an intra-inter prediction according to an embodiment of the disclosure. The available intra prediction modes may include two non-angular prediction modes and 4k+1 angular prediction modes, where k is a positive integer greater than 1. The available non-angular prediction modes may include a planar mode and a DC mode. The directions of reference of the available angular prediction modes may include the vertical direction (V), the horizontal direction (H), and directions (V−1) . . . (V−k), (V+1) . . . (V+k), (H−1) . . . (H−k+1), and (H+1) . . . (H+k) within a 180-degree span from the vertical diagonal direction (V+1) to the horizontal vertical diagonal direction H(+1), where adjacent directions are separated by 45/k degrees. In some examples, the available intra prediction modes may further include other applicable angular or non-angular prediction modes, such as a horizontal planar mode or a vertical planar mode.

The signaling of a selected intra prediction mode may be arranged similar to those illustrated with reference to Table 1 and Table 2. Also, the intra prediction modes for the intra-inter prediction may be a subset of available intra prediction modes for the intra prediction.

In some examples, the available intra prediction modes for intra-inter prediction may be arranged in a descending order of frequency of usage, or listing the MPMs for intra prediction on the top and then followed by a subset of the rest of the intra prediction modes for the intra prediction, either in a predetermined order or a descending order of frequency of usage. The available intra prediction may be coded accordingly using variable-length or fixed-length coding.

In one example, the intra-inter prediction may use 69 intra prediction modes, including 65 angular prediction modes and 4 non-angular prediction modes. The first five listed intra prediction modes may be the MPMs and can share the context coding scheme used by the intra prediction or a different context coding scheme. The remaining 64 intra prediction modes can be fixed-length coded or variable-length coded. Table 3 shows an example coding scheme as discussed above.

TABLE 3

| Intra prediction mode list index | Bin strings |
| --- | --- |
| 0 | 1 |
| 1 | 010 |
| 2 | 0110 |
| 3 | 01110 |
| 4 | 01111 |
| 5 | 00 + additional bins |
| . . . | 00 + additional bins |
| 68 | 00 + additional bins |

In one example, the intra-inter prediction may use 67 intra prediction modes, including 65 angular prediction modes and 2 non-angular prediction modes as described in the reference software named Joint Exploration Model (JEM) for the Joint Video Exploration Team (WET) group.

In another example, the intra-inter prediction may use 37 intra prediction modes, including 33 angular prediction modes and 2 non-angular prediction modes as proposed in H.265/HEVC standard. The first five listed intra prediction modes may be the MPMs of the intra prediction. The remaining 32 intra prediction modes can be fixed-length coded (with five extra bins) or variable-length coded. Table 4 shows an example coding scheme as discussed above.

TABLE 4

| Intra prediction mode list index | Bin strings |
| --- | --- |
| 0 | 1 |
| 1 | 010 |
| 2 | 0110 |
| 3 | 01110 |
| 4 | 01111 |
| 5 | 00 + additional bins |
| . . . | 00 + additional bins |
| 36 | 00 + additional bins |

In a generalized example, the intra-inter prediction may use N intra prediction modes, where N is a positive integer greater than 5. The first five listed intra prediction modes may be the MPMs of the intra prediction. The remaining intra prediction modes can be fixed-length coded or variable-length coded. Table 5 shows an example coding scheme as discussed above.

TABLE 5

| Intra prediction mode list index | Bin strings |
| --- | --- |
| 0 | 1 |
| 1 | 010 |
| 2 | 0110 |
| 3 | 01110 |
| 4 | 01111 |
| 5 | 00 + additional bins |
| ... | 00 + additional bins |
| N-1 | 00 + additional bins |

In one example, the available intra prediction modes for intra-inter prediction can include only the five MPMs of the intra prediction.

In yet another generalized example, the intra-inter prediction may use N intra prediction modes, where N is a positive integer greater than 3. The first three listed intra prediction modes may be the MPMs of the intra prediction. The remaining intra prediction modes can be fixed-length coded or variable-length coded. Table 6 shows an example coding scheme as discussed above.

TABLE 6

| Intra prediction mode list index | Bin strings |
| --- | --- |
| 0 | 1 |
| 1 | 010 |
| 2 | 011 |
| 3 | 00 + additional bins |
| ... | 00 + additional bins |
| N-1 | 00 + additional bins |

In one example, the available intra prediction modes for intra-inter prediction can include only the five MPMs of the intra prediction.

Of course, there may be many other applicable approaches of arranging the order of available intra prediction modes and the corresponding coding scheme. In addition, the bins illustrated with reference to Table 3, Table 4, Table 5, and Table 6 can be context coded or bypass coded. Moreover, the number of available intra prediction modes for intra-inter prediction may vary with a size or a shape of the current block. For example, a block having a greater size may use a greater number of available intra prediction modes, and a block having a smaller size may use a less number of available intra prediction modes. In some examples, one or more syntax elements in the SPS or PPS of the encoded video data may be used to indicate a predetermined set of intra prediction modes available to the intra-inter prediction in the corresponding sequence or picture(s).

Figure 5A:
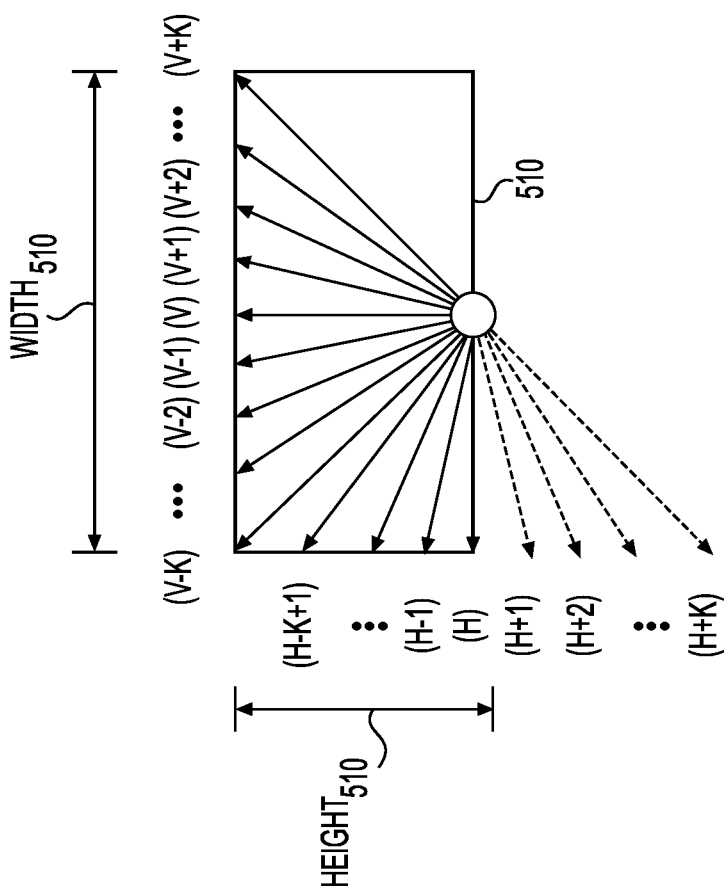
FIGS. 5A-5D show diagrams illustrating another four example sets of available intra prediction modes for an intra-inter prediction according to an exemplary embodiment of the disclosure.

FIG. 5A shows a diagram illustrating an exemplary set of available intra prediction modes for an intra-inter prediction according to an embodiment of the disclosure. The available angular prediction modes for an intra prediction may correspond to directions of reference that include the vertical direction (V), the horizontal direction (H), and directions (V−1) ... (V−k), (V+1) ... (V+k), (H−1) ... (H−k+1), and (H+1) ... (H+k), where k is a positive integer greater than 1. Moreover, a block 510 may have a width $WIDTH_{510}$ and a height $HEIGHT_{510}$. When the width $WIDTH_{510}$ of the block 510 is greater than the height $HEIGHT_{510}$ of the block 510, the available intra prediction modes for coding the block 510 using the intra-inter prediction may excludes a portion of the angular prediction modes that have directions corresponding to a counterclockwise rotation to the horizontal direction (H). As shown in FIG. 5A, the excludable angular prediction modes may correspond to the directions of (H+1) ... (H+k).

Figure 5B:
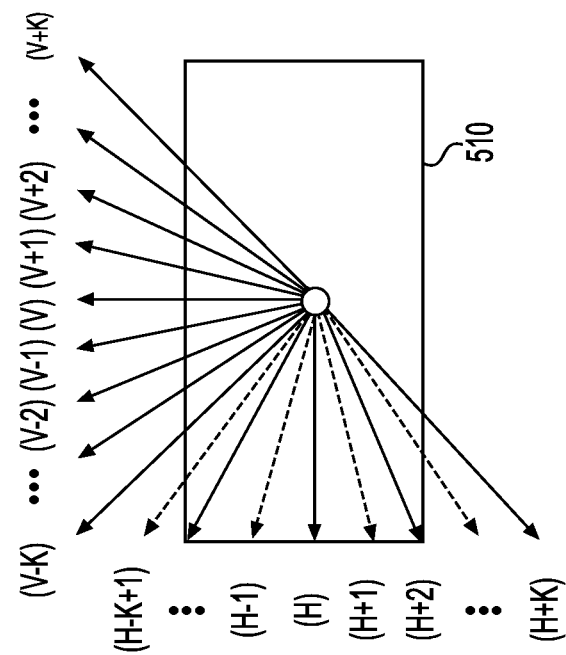

FIG. 5B shows a diagram illustrating another exemplary set of available intra prediction modes for an intra-inter prediction according to an embodiment of the disclosure for the block 510 that has a longer width than height as described with reference to FIG. 5A. The available intra prediction modes for coding the block 510 using the intra-inter prediction may excludes a portion of the angular prediction modes that are evenly distributed among all directions of reference pointing to the left edge (e.g., within +/−45 degrees from the horizontal direction H). As shown in FIG. 5B, the excludable angular prediction modes may correspond to the directions of (H+k') or (H−k'), where k' refers to odd numbers between +k and −k. Other applicable approaches of reducing the number of angular prediction modes for the shorter edge are within the contemplated embodiments.

Figure 5D:
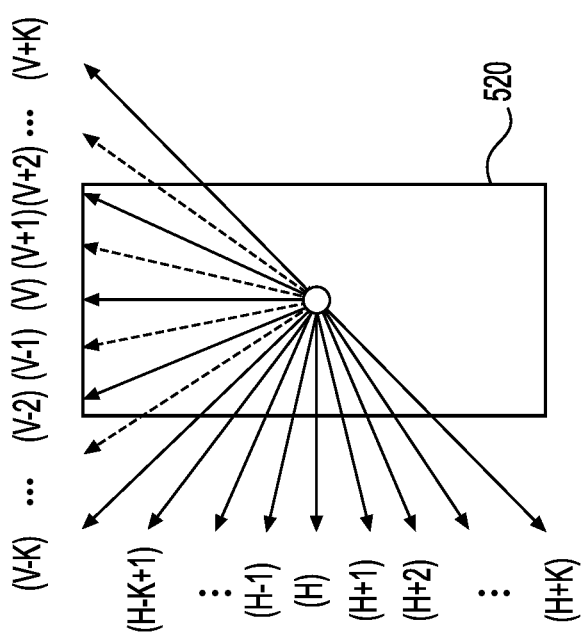
Figure 5C:
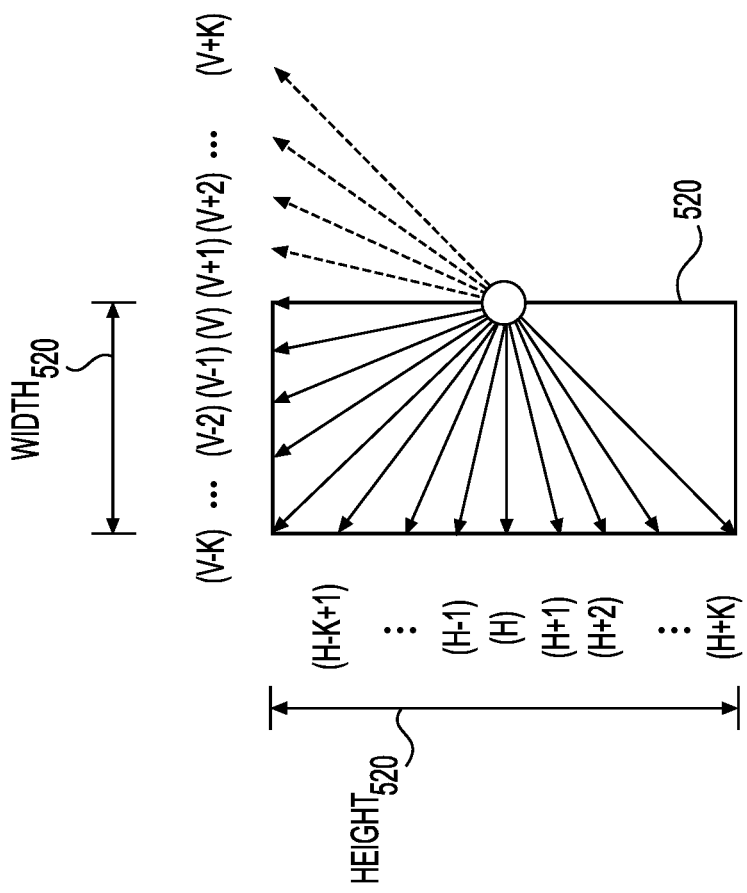

FIG. 5C shows a diagram illustrating an exemplary set of available intra prediction modes for an intra-inter prediction according to an embodiment of the disclosure. Compared with block 510, a block 520 may have a width $WIDTH_{520}$ and a height $HEIGHT_{520}$. When the width $WIDTH_{520}$ of the block 520 is less than the height $HEIGHT_{520}$ of the block 520, the available intra prediction modes for coding the block 520 using the intra-inter prediction may excludes a portion of the angular prediction modes that have directions corresponding to a clockwise rotation to the vertical direction (V). As shown in FIG. 5B, the excludable angular prediction modes may correspond to the directions of (V+1) ... (V+k).

FIG. 5D shows a diagram illustrating another exemplary set of available intra prediction modes for an intra-inter prediction according to an embodiment of the disclosure for the block 520 that has a longer height than width as described with reference to FIG. 5C. The available intra prediction modes for coding the block 520 using the intra-inter prediction may excludes a portion of the angular prediction modes that are evenly distributed among all directions of reference pointing to the upper edge (e.g., within +/−45 degrees from the vertical direction V). As shown in FIG. 5D, the excludable angular prediction modes may correspond to the directions of (V+k') or (V−k'), where k' refers to odd numbers between +k and −k. Other applicable approaches of reducing the number of angular prediction modes for the shorter edge are within the contemplated embodiments.

As shown in FIGS. 5A-5D, by reducing the number of available intra prediction modes for intra-inter prediction, the overhead for signaling the prediction parameters may be further reduced.

Figure 6:
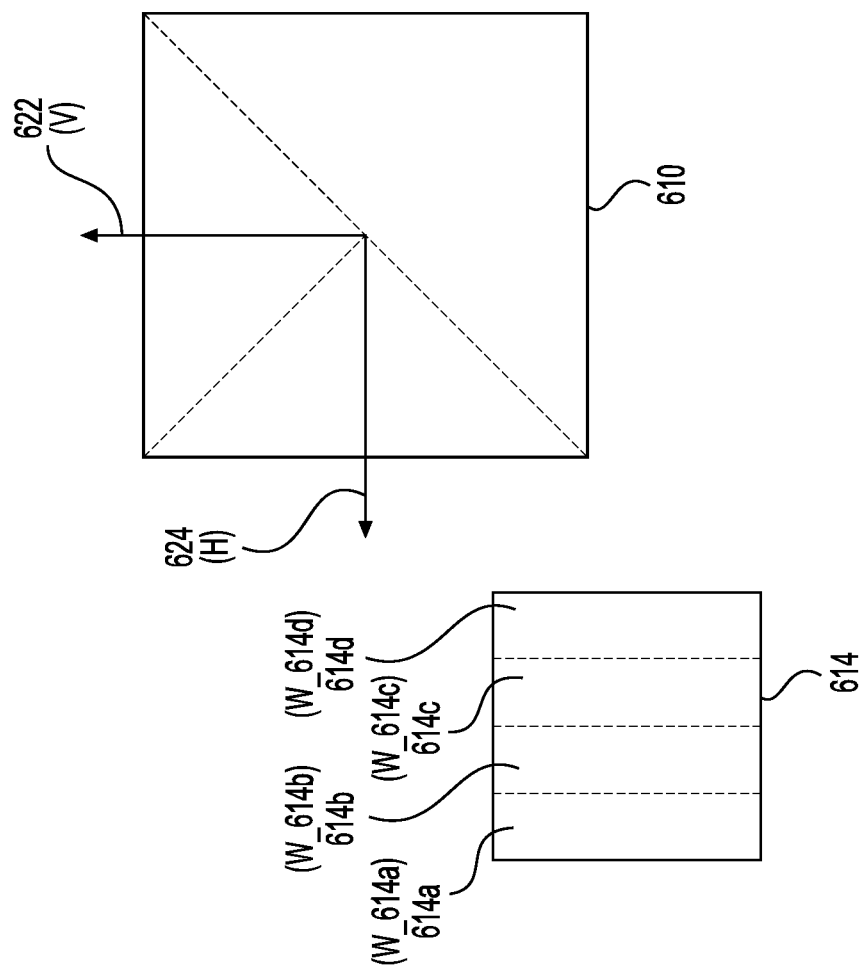
FIG. 6 shows an exemplary diagram illustrating an example arrangement of intra weight coefficients applicable to various portions of a block in association with different directions of reference of various intra prediction modes according to an embodiment of the disclosure.

FIG. 6 shows a diagram illustrating an example arrangement of intra weight coefficients applicable to various portions of a block in association with different directions of reference of various intra prediction modes according to an embodiment of the disclosure. FIG. 6 shows a block 610 and two representative directions 622 and 624. Representative direction 622 corresponds to the vertical direction (V) among the available intra prediction modes, and representative direction 624 corresponds to the horizontal direction (H) among the available intra prediction modes. The closest one of the representative directions 622 and 624 to a direction of reference of the intra prediction mode is identified as the identified representative direction. Also, the block 610 may be divided into a predetermined number of portions arranged along the identified representative direction. In some examples, combining the inter predictor and the intra predictor is performed according to intra weight coefficients for the portions of the block, respectively. The values of the intra weight coefficients may be set in an ascending order along the identified representative direction such that the values of the intra weight coefficients increase when distances between the corresponding portions and the samples of neighboring pixels along the identified representative direction decrease.

For example, when the intra prediction mode is an angular mode that is closer to the vertical direction (V) than the horizontal direction (H), such as directions (V−k+1) . . . (V+k) in FIG. 4C, the representative 622 or the vertical direction (V) would be the identified representative direction. The block 610 may be divided into plural portions arranged along the vertical direction (V), such as the example block 612 with four portions 612a, 612b, 612c, and 612d. The values of the intra weight coefficients w_612a, w_612b, w_612c, and w_612d for the portions 612a, 612b, 612c, and 612d may be set in an ascending order along the identified representative direction. For example, w_612a, w_612b, w_612c, and w_612d may be set as 0.8, 0.6, 0.4, and 0.2, respectively. In this example, the values of the inter weight coefficients inter_w_612a, inter_w_612b, inter_w_612c, and inter_w_612d for the portions 612a, 612b, 612c, and 612d may be set as 1−w_612a, 1−w_612b, 1−w_612c, and 1−w_612d (i.e., 0.2, 0.4, 0.6, 0.8, respectively).

In another example, when the intra prediction mode is an angular mode that is closer to the horizontal direction (H) than the vertical direction (V), such as directions (H−k+1) . . . (H+k) in FIG. 4C, the representative 624 or the horizontal direction (H) would be the identified representative direction. The block 610 may be divided into plural portions arranged along the horizontal direction (H), such as the example block 614 with four portions 614a, 614b, 614c, and 614d. The values of the intra weight coefficients w_614a, w_614b, w_614c, and w_614d for the portions 614a, 614b, 614c, and 614d may be set in an ascending order along the identified representative direction. For example, w_614a, w_614b, w_614c, and w_614d may be set as 0.8, 0.6, 0.4, and 0.2, respectively. In this example, the values of the inter weight coefficients inter_w_614a, inter_w_614b, inter_w_614c, and inter_w_614d for the portions 614a, 614b, 614c, and 614d may be set as 1−w_614a, 1−w_614b, 1−w_614c, and 1−w_614d (i.e., 0.2, 0.4, 0.6, 0.8, respectively).

Moreover, if a direction of reference of an intra prediction mode is about the same distance to both representative directions 622 and 624, such as the direction (V−k), such direction may be defined as to be closer to the direction to its clockwise rotation or counterclockwise rotation, or both such that the intra weight coefficients would be the average of both schemes.

Figure 7:
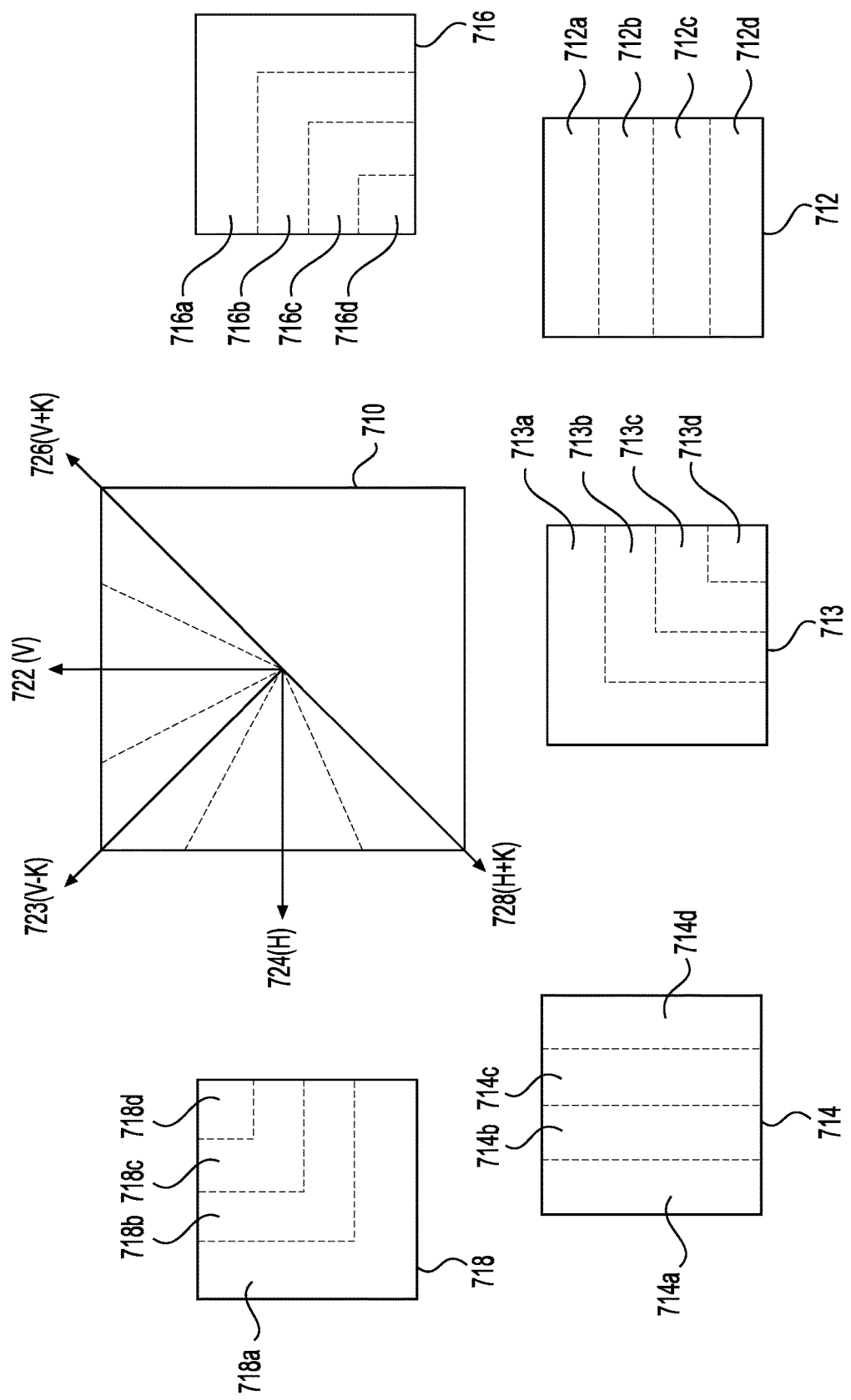
FIG. 7 shows an exemplary diagram illustrating another example arrangement of intra weight coefficients applicable to various portions of a block in association with different directions of reference of various intra prediction modes according to an embodiment of the disclosure.

FIG. 7 shows a diagram illustrating another exemplary arrangement of intra weight coefficients applicable to various portions of a block in association with different directions of reference of various intra prediction modes according to an embodiment of the disclosure. FIG. 7 shows a block 710 and five representative directions 722, 723, 724, 726, and 728. Representative direction 722 corresponds to the vertical direction (V) among the available intra prediction modes, and representative direction 724 corresponds to the horizontal direction (H) among the available intra prediction modes. Also, representative direction 723 corresponds to the diagonal direction (V−k), representative direction 724 corresponds to the vertical diagonal direction (V+k), and representative direction 726 corresponds to the horizontal diagonal direction (H+k). In some examples, more or less than five representative directions may be used for assigning the weigh coefficients. The representative directions may be evenly spread in a 180-degree span from the vertical diagonal direction (V+k) to the horizontal diagonal direction (H+k).

Similar to the example illustrated with reference to FIG. 6, the closest one of the representative directions 722, 723, 724, 726, and 728 to a direction of reference of the intra prediction mode is identified as the identified representative direction. Also, the block 710 may be divided into a predetermined number of portions arranged along the identified representative direction. The values of the intra weight coefficients may be set in an ascending order along the identified representative direction such that the values of the intra weight coefficients increase when distances between the corresponding portions and the samples of neighboring pixels along the identified representative direction decrease.

For example, when the intra prediction mode is an angular mode that is closer to the representative 722 or the vertical direction (V), the block 710 may be divided into plural portions arranged along the vertical direction (V), such as the example block 712 with four portions 712a, 712b, 712c, and 712d. The values of the intra weight coefficients applicable to the portions 712a, 712b, 712c, and 712d may be set in an ascending order along the identified representative direction. In another example, when the intra prediction mode is an angular mode that is closer to the representative 724 or the horizontal direction (H), the block 710 may be divided into plural portions arranged along the horizontal direction (H), such as the example block 714 with four portions 714a, 714b, 714c, and 714d. The values of the intra weight coefficients applicable to the portions 714a, 714b, 714c, and 714d may be set in an ascending order along the identified representative direction.

Similarly, for an intra prediction mode having a direction closer to the representative direction 723 (V−k), 726 (V+k), or 728 (H+k), the block 710 may be divided into plural portions arranged along such representative direction. For example, example block 713 may correspond to intra prediction modes closer to the representative direction 723 (V−k), where the block 713 is divided into four portions 713a, 713b, 713c, and 713d arranged along the representative direction 723 (V−k). The values of the intra weight coefficients applicable to the portions 713a, 713b, 713c, and 713d may be set in an ascending order along the representative direction 723 (V−k). Example block 716 may correspond to intra prediction modes closer to the representative direction 726 (V+k), where the block 716 is divided into four portions 716a, 716b, 716c, and 716d arranged along the representative direction 726 (V+k). The values of the intra weight coefficients applicable to the portions 716a, 716b, 716c, and 716d may be set in an ascending order along the representative direction 726 (V+k). Also, example block 718 may correspond to intra prediction modes closer to the representative direction 728 (H+k), where the block 718 is divided into four portions 718a, 718b, 718c, and 718d arranged along the representative direction 728 (H+k). The values of the intra weight coefficients applicable to the portions 718a, 718b, 718c, and 718d may be set in an ascending order along the representative direction 728 (H+k).

Also, if a direction of an intra prediction mode is about the same distance to both reference directions 722-728, such direction may be defined as to be closer to the direction to its clockwise rotation or counterclockwise rotation, or both as illustrated with reference to FIG. 7.

Furthermore, as shown in FIG. 6 and FIG. 7, the block 610 or 710 may be divided into four portions. In some examples, the number of portions may be determinable based on a size of the block 610 or 710, where a larger block may be divided into a greater number of portions. The possible number portions may range from 2 to the number of pixels on one side of the block. Also, the portions may be divided in any suitable manner, including any suitable size or shape.

Figure 8:
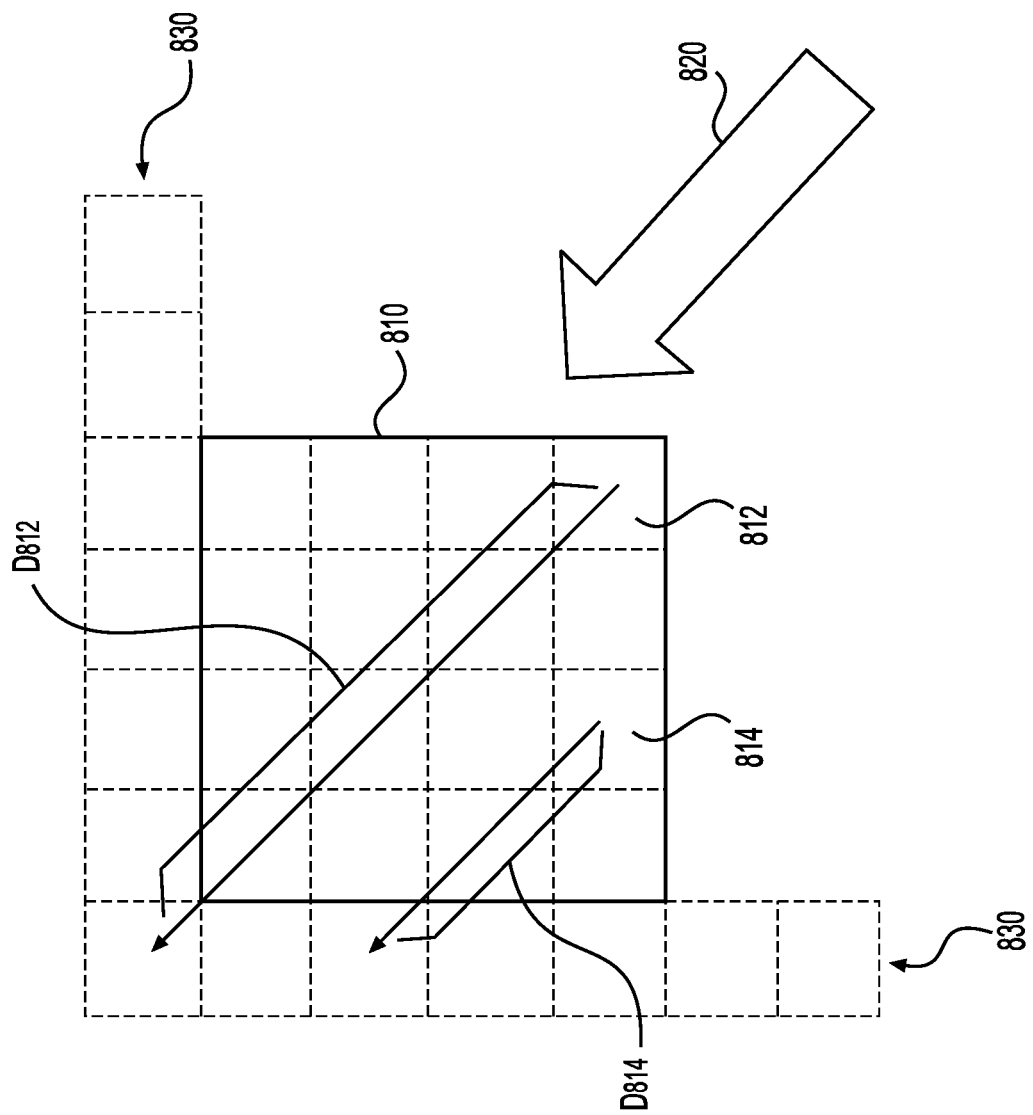
FIG. 8 shows an exemplary diagram illustrating an example arrangement of intra weight coefficients applicable to various portions of a block in association with various distances to samples of neighboring pixels along a direction of reference of an example intra prediction mode according to an embodiment of the disclosure.

FIG. 8 shows a diagram illustrating an example arrangement of intra weight coefficients applicable to various portions of a block 810 in association with various distances to samples of neighboring pixels along a direction of reference 820 of an example intra prediction mode according to an exemplary embodiment of the disclosure. The block 810 is divided into a predetermined number of portions when the intra prediction mode is an angular prediction mode having a direction of reference 820. An intra predictor of the block 810 may be generated based on the direction of reference 820 and the samples of neighboring pixels 830. In some examples, each portion can be as small as just one pixel.

As shown in FIG. 8, the block 810 is divided into 16 portions. The combining the inter predictor and the intra predictor for block 810 can be performed according to intra weight coefficients for the predetermined number of portions, respectively. Also, the values of the intra weight coefficients can be set based on the distances between the corresponding portions and the samples of neighboring pixels 830 along the direction of reference 820 of the intra prediction mode. For example, the intra weight coefficient applicable to the portion 812 may be determined based on a distance $D_{812}$ between the portion 812 and the neighboring pixels along the direction of reference 820. Similarly, the intra weight coefficient applicable to the portion 814 may be determined based on a distance $D_{814}$ between the portion 814 and the neighboring pixels along the direction of reference 820.

In some examples, the values of the intra weight coefficients increase when distances between the corresponding portions and the samples of neighboring pixels along the direction of reference of the intra prediction mode decrease. In at least one example, when the distance between a specific portion of the block and the neighboring pixels along the direction of reference 820 is D, the value of the intra weight coefficient w_intra may be determined as:

$$w\_intra(D)=a*D^2+b.$$

In this equation, a and b are positive numbers that may be included in the encoded video data, such as in the SPS, PPS, or slice header of the encoded video data. Alternatively, a and b may be predefined according to a predetermined video coding standard and thus may be hard-coded in the decoding circuit or the encoding circuit.

In some examples, intra weight coefficients of the current block may be derived from the intra weight coefficients of a previous block, provided that the adjustment parameters for deriving the intra weight coefficients are signaled.

Of course, FIGS. 6-8 are used to show non-limiting examples of assigning the intra weight coefficients. There may be many other suitable approaches to assign the intra weight coefficients for combining the intra predictor and the inter predictor for a current block.

Figure 9:
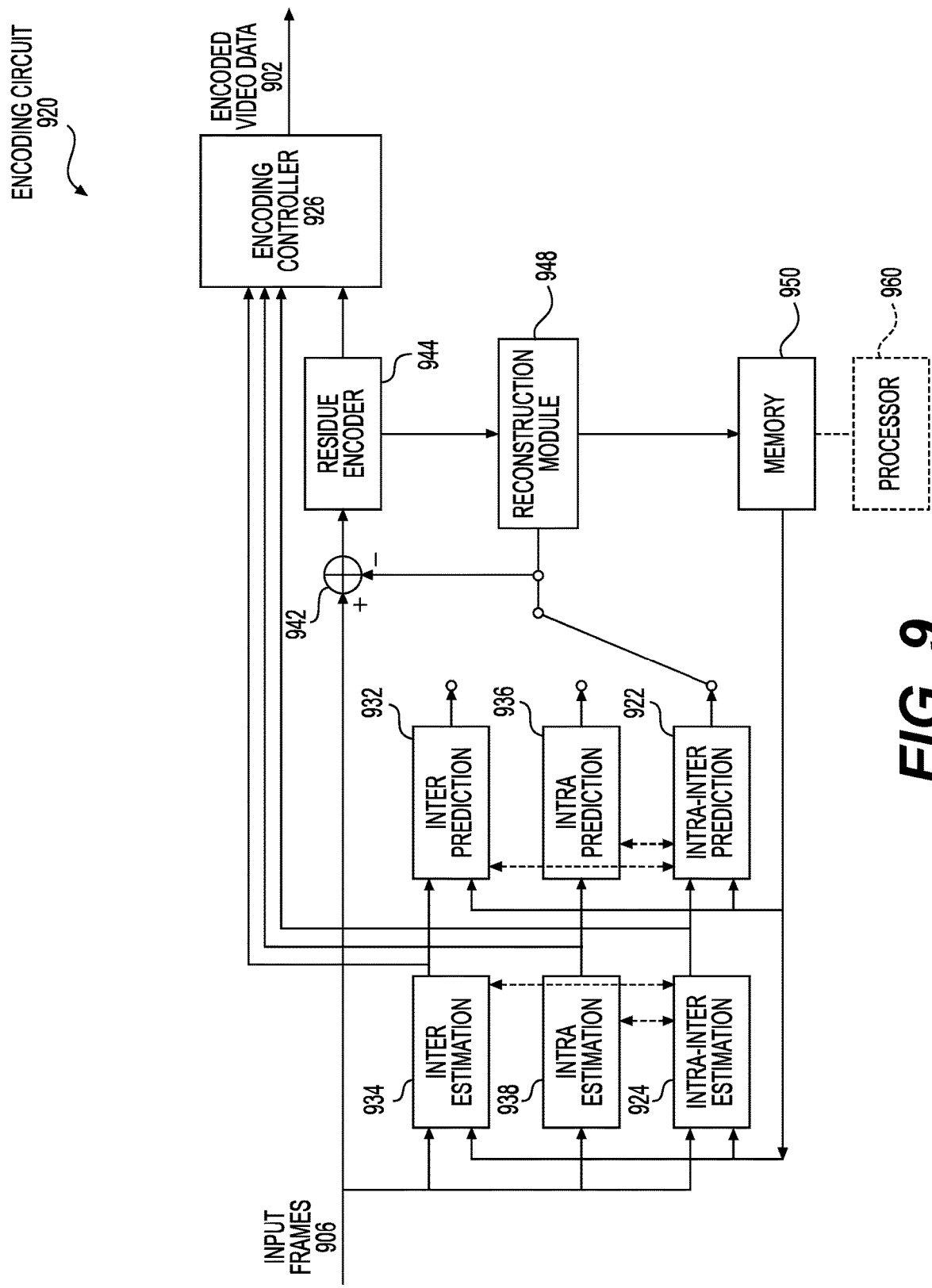
FIG. 9 shows an exemplary functional block diagram of a processing circuit for video encoding in the video coding system in FIG. 1 according to an embodiment of the disclosure.

FIG. 9 shows an exemplary functional block diagram of a processing circuit 920 for video encoding in a video coding system, such as the video coding system 100 in FIG. 1 according to an embodiment of the disclosure. FIG. 9 is a simplified illustration of the encoding circuit 920 and thus may not show all the details and variations of the encoding circuit 920.

The encoding circuit 920 includes an intra-inter prediction module 922, an intra-inter estimation module 924, and an encoding controller 926 that may correspond to the intra-inter prediction module 122, the intra-inter estimation module 124, and the encoding controller 126 in FIG. 1, respectively. The encoding circuit 920 also includes an inter prediction module 932, an inter estimation module 934, an intra prediction module 936, an intra estimation module 938, an adder 942, a residue encoder 944, a reconstruction module 948, a memory 950, and a processor 960.

The encoding controller 926 supervises the operation of the intra-inter prediction module 922, intra-inter estimation module 924, inter prediction module 932, inter estimation module 934, intra prediction module 936, and intra estimation module 938. The encoding controller 926 may instruct the intra-inter estimation module 924, inter estimation module 934, and/or intra estimation module 938 to divide each input frame into blocks and to determine the prediction scheme, prediction mode, and/or corresponding prediction parameters for each block. The encoding controller 926 may select one of the intra-inter prediction module 922, inter prediction module 932, and intra prediction module 936 to output a corresponding final predictor of a current block to the adder 942. The adder 942 receives an original image of the current block and the final predictor of the current block and outputs a residual portion of the current block by subtracting the final predictor from the original image of the current block. The residue encoder 944 receives and encodes the residual portion of the current block. The encoding controller 926 may generate the encoded video data 902 based on the prediction parameters from the intra-inter estimation module 924, inter estimation module 934, and/or intra estimation module 938 and the output from the residue encoder 944.

In some examples, the use of the intra-inter prediction may be signaled as a standalone prediction mode. In some examples, the use of the intra-inter prediction for the current block may be indicated as a special case of the inter prediction. In such scenario, the encoding controller 926 may include in the encoded video data 902 information identifying if the current block is encoded using inter prediction, and then include a flag identifying the use of the intra-inter prediction only if the current block is identified as encoded using inter prediction (in some embodiment, the corresponding inter information may be signaled accordingly). If the current block is encoded using the inter-intra prediction, then the intra information (e.g., Horizontal mode is selected) is signaled. Otherwise, no intra information is signaled. In some examples, the use the intra-inter prediction for the current block may be indicated as a special case of the intra prediction. In such scenario, the encoding controller 926 may include in the encoded video data 902 information identifying if the current block is encoded using intra prediction, and then include a flag identifying the use of the intra-inter prediction only if the current block is identified as encoded using intra prediction (in some embodiment, the corresponding intra information may be signaled accordingly). If the current block is encoded using the inter-intra prediction, then the inter information (e.g., motion vector predictor index, prediction direction, or reference picture index) is signaled. Otherwise, no inter information is signaled.

The intra-inter prediction module 922, inter prediction module 932, and intra prediction module 936 may receive prediction parameters from the intra-inter estimation module 924, inter estimation module 934, and intra estimation module 938, respectively, and may generate corresponding final predictors for the current block in a manner similar to the operations of the intra-inter prediction module 312, inter prediction module 332, and intra prediction module 336 in FIG. 3. Detailed description thereof is thus omitted.

In some examples, the encoding controller 926 may control the intra-inter estimation module 924, inter estimation module 934, intra estimation module 938, intra-inter prediction module 922, inter prediction module 932, intra prediction module 936, and/or the residue encoder 944 to encode the current block based on different prediction schemes and parameters and then may select an optimal combination of encoding scheme and parameters for encoding the current block.

The reconstruction module 948 may receive the final predictor from the intra-inter prediction module 922, intra prediction module 932, or inter prediction module 936 and a reconstructed residual portion of the current block from the residue encoder 944. Based on such information, the reconstruction module 948 may generate a reconstructed image of the current block and/or reconstructed frames in a manner similar to the operations of the adder 342 and the output filter 346 in FIG. 3. The reconstructed blocks and/or frames can be stored in the memory 950 and are accessible by the intra-inter prediction module 922, intra prediction module 932, inter prediction module 936, intra-inter estimation module 924, intra estimation module 934, and/or inter estimation module 938 for estimating prediction parameters for a next block.

In operation, when a block of a frame (i.e., a current block) is to be encoded using intra-inter prediction as instructed by the encoding controller 926, the intra-inter estimation module 924 receives the original image of the current block from the input frames 906. The intra-inter estimation module 924 may determine suitable prediction parameters, such as a selected motion vector, a selected intra prediction mode, and/or the associated weight coefficient(s). The intra prediction mode for intra-inter prediction may be selected from available intra prediction modes as illustrated with reference to FIGS. 4A-5D. The weight coefficient(s) may be determined as illustrated with reference to FIGS. 6-8.

In some examples, the intra-inter estimation module 924 may coordinate with the inter estimation module 934 and/or the intra estimation module 938 to obtain a motion information and/or an intra prediction mode therefrom, and may make a final determination with respect to the suitable prediction parameters in view of the weight coefficient(s). The intra-inter estimation module 924 then sends the prediction parameters to the encoding controller 926 and the intra-inter prediction module 922.

The intra-inter prediction module 922 may generate a final predictor of the current block based on the prediction parameters provide by the intra-inter estimation module 924. The intra-inter prediction module 922 may generate the intra predictor of the current block according to samples of neighboring pixels and the intra prediction mode. Alternatively, the intra-inter prediction module 922 may request the intra prediction module 936 to generate the intra predictor of the current block. Moreover, the intra-inter prediction module 922 may generate the inter predictor of the current block according to the motion information. Alternatively, the intra-inter prediction module 922 may request the inter prediction module 932 to generate the inter predictor of the current block. After the generation of the intra predictor and the inter predictor of the current block, the intra-inter prediction module 922 generates a final predictor of the current block by combining the intra predictor and the inter predictor of the current block according to one or more intra weight coefficients associated with the intra prediction mode.

The intra-inter prediction module 922, inter prediction module 932, and/or intra prediction module 936 may generate the final predictor in a manner similar to the operation of the intra-inter prediction module 312. Therefore, detailed description thereof is omitted.

The adder 942 may output a residual portion of the current block based on the original image of the current block and the final predictor and encoded the residual portion. The encoding controller 926 may collect the prediction parameters from the inter-intra estimation module 924, inter estimation module 934, and/or intra estimation module 938 and the encoded residual information and determine whether the selected coding scheme for the current block is acceptable.

Also, the encoding controller 926 may encode the selected intra prediction mode in a manner as illustrated with reference to Table 1 to Table 6.

Moreover, as shown in FIG. 9, the processor 960 is electrically coupled with the memory 950 and can be configured to execute program instructions stored in the memory 950 to perform various functions. The processor 960 can include a single or multiple processing cores. Various components of the encoding circuit 920, such as the encoding controller 926, intra-inter prediction module 922, intra-inter estimation module 924, inter prediction module 932, inter estimation module 934, intra prediction module 936, intra estimation module 938, adder 942, residue encoder 944, and/or reconstruction module 948, may be implemented by hardware components, the processor 960 executing the program instructions, or a combination thereof. Of course, the processor 960 can also execute program instructions to control receiving of the input frames 906 and the output of the encoded video data 902. In some examples, the processor 960 can execute program instructions to perform functions that may not be directly related to encoding the encoded video data 902.

The memory 950 can be used to store the program instructions, information corresponding to the prediction parameters reconstructed blocks, input frames, and/or intermediate data for performing various functions of the encoding circuit 910. In some examples, the memory 950 includes a non-transitory computer readable medium, such as a semiconductor or solid-state memory, a random access memory (RAM), a read-only memory (ROM), a hard disk, an optical disk, or other suitable storage medium. In some embodiments, the memory 950 includes a combination of two or more of the non-transitory computer readable mediums listed above.

Moreover, the decoding circuit 310 in FIG. 3 and the encoding circuit 920 in FIG. 9 may be implemented in the same electronic device, and various components of the decoding circuit 310 and the encoding circuit 920 may be shared or reused. For example, one or more of the memory 350, processor 360, intra-inter prediction module 312, intra prediction module 332, inter prediction module 336, and output filter 346 in the decoding circuit 310 may also be used to function as the memory 950, processor 960, intra-inter prediction module 922, intra prediction module 932, inter prediction module 936, and reconstruction module 948 in FIG. 9, respectively.

Figure 10:
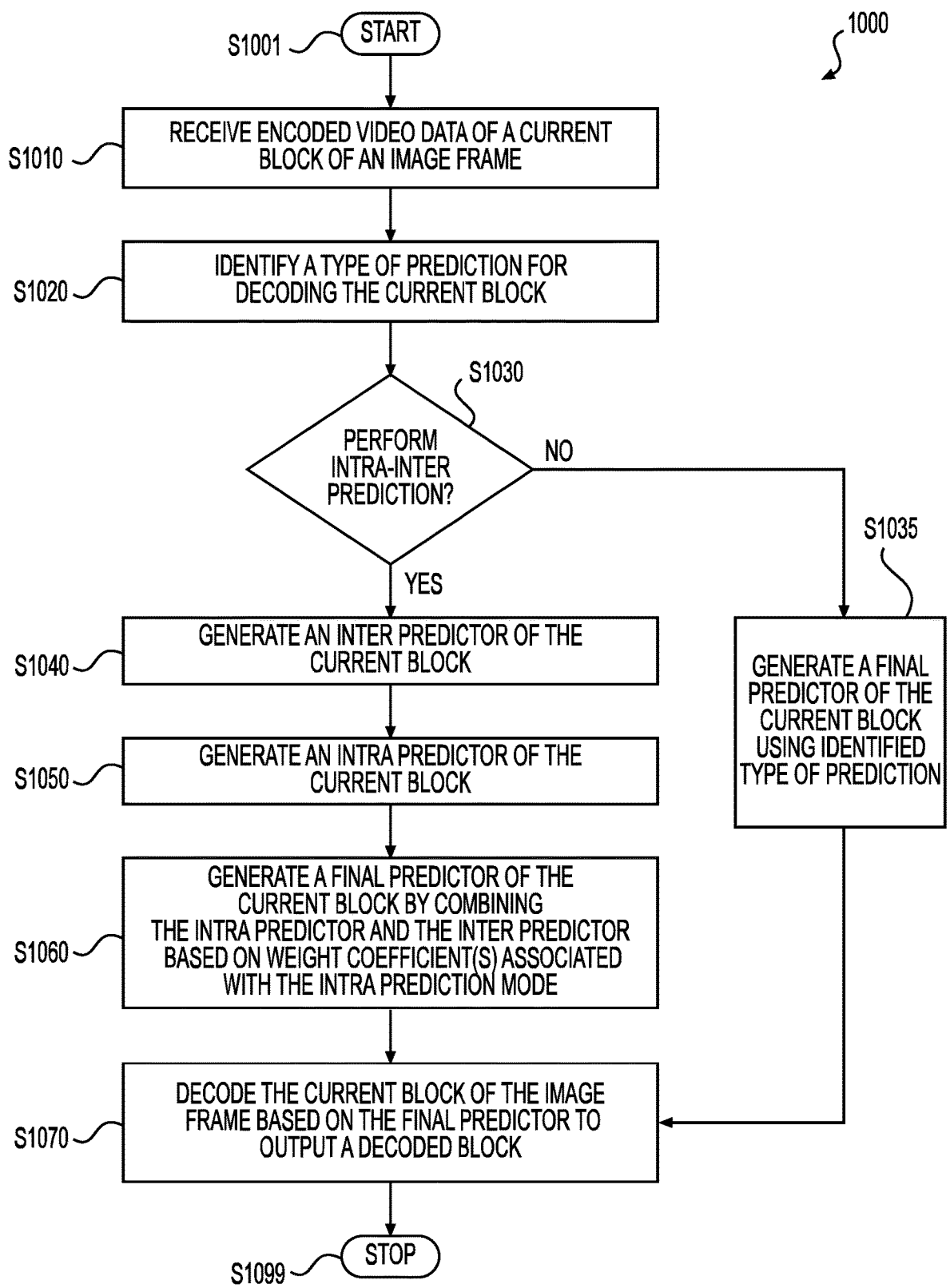
FIG. 10 shows a flow chart outlining an exemplary video decoding process using a processing circuit for video decoding, such as the processing circuit in FIG. 3, according to an embodiment of the disclosure.

FIG. 10 shows a flow chart outlining an exemplary video decoding process 1000 using a processing circuit for video decoding, such as the processing circuit 310 in FIG. 3, according to an embodiment of the disclosure. It is understood that additional operations may be performed before, during, and/or after the process 1000 depicted in FIG. 10. The process 1000 starts at S1001 and proceeds to S1010.

At S1010, encoded video data associated with a current block in an image frame are received as input data. For example, the decoding controller 316 may receive the encoded video data 302 that includes the input data associated with the current block.

At S1020, a type of prediction for decoding the current block is determined. For example, the decoding controller 316 may receive the encoded video data 302 that includes the input data associated with the current block. The decoding controller 316 may extract prediction parameters from the encoded video data 302 and determines whether the current block is encoded using an inter prediction, an intra prediction, or an intra-inter prediction.

As illustrated with referenced to FIG. 2, when the current block is encoded using the intra-inter prediction, the current block is to be decoded by generating an inter predictor and an intra predictor and combining the inter predictor and the intra predictor to generate a final predictor. In some examples, a flag indicating whether the current block is encoded using the final predictor generated based on combining the inter predictor and the intra predictor (i.e., using the intra-inter prediction) is extracted from the syntax elements at the block level (e.g., PU level) in the encoded video data. The flag may be bypass coded or context coded, using one, two or three contexts. In some examples, the intra-inter prediction is arranged as a special case of the inter prediction, and the flag is extracted from the encoded video data only if the current block is identified in the encoded video data or is identified in the input data by another flag as encoded using the inter prediction. In some examples, the intra-inter prediction is arranged as a special case of the intra prediction, and the flag is extracted from the encoded video data only if the current block is identified in the encoded video data or is identified in the input data by another flag as encoded using the intra prediction.

Moreover, an enable flag indicating whether the intra-inter prediction is enabled or disabled for the corresponding sequence or picture(s) may be extracted from the SPS, PPS, or some other high-level properties of the encoded video data. When the enable flag indicates that the intra-inter prediction is enabled for the corresponding sequence or picture(s), a block level flag may be extracted or checked for identifying is the corresponding block in the corresponding sequence or picture(s) is encoded using the intra-inter prediction. When the enable flag indicates that the intra-inter prediction is disabled for the corresponding sequence or picture(s), no block in the corresponding sequence or picture(s) is encoded using the intra-inter prediction, and the aforementioned PU flag may not need to be extracted or checked.

At S1030, if the current block is to be decoded using the intra-inter prediction, the process proceeds to S1040. If the current block is to be decoded using an identified type of prediction other than the intra-inter prediction, the process proceeds to S1035. For example, if the decoding controller 316 identifies that the current block is encoded using the intra-inter prediction, the process proceeds to S1040; otherwise, the process proceeds to S1035.

At S1035, a final predictor of the current block is generated using the identified type of prediction. For example, when the current block is encoded using the inter prediction, the inter prediction module 332 may generate the final predictor of the current block. Also, when the current block is encoded using the intra prediction, the intra prediction module 336 may generate the final predictor of the current block.

At S1040, the inter predictor of the current block is generated based on a motion vector and a reference image. The motion vector may be explicitly provided in the encoded video data or derived based on motion information provided in the encoded video data. For example, the intra-inter prediction module 312 may, by itself or with the assistance of the inter prediction module 332, generate an inter predictor of the current block as discussed with reference to FIG. 3. In some examples, the inter predictor is generated using the motion vector that can be determined by deriving a motion vector using an Advanced Motion Vector Prediction (AMVP), Merge, or Skip mode.

At S1050, the intra predictor of the current block is generated based on samples of neighboring pixels and an intra prediction mode that locates the samples of neighboring pixels. The intra prediction mode may be explicitly provided in the encoded video data or derived based on information provided in the encoded video data. For example, the intra-inter prediction module 312 may, by itself or with the assistance of the intra prediction module 336, generate an intra predictor of the current block as discussed with reference to FIG. 3.

In some examples, the intra prediction mode for the current block using the intra-inter prediction may be selected from a first plurality of predetermined intra prediction modes, and a second block may be encoded or decoded based on a intra predictor derived according to a second intra prediction mode selected from a second plurality of predetermined intra prediction modes. The first plurality of predetermined intra prediction modes may be a subset of the second plurality of predetermined intra prediction modes as discussed with reference to FIG. 3. The first plurality of predetermined intra prediction modes may include at least most probable modes (MPMs) selected from the second plurality of predetermined intra prediction modes. In some examples, when the current block is a chroma block, the first plurality of predetermined intra prediction modes may include one or more of the direct mode, linear mode, DC mode, planar mode, horizontal mode, and/or vertical mode.

Moreover, a number of the first plurality of predetermined intra prediction modes can be determinable based on a size of the current block. Also, when a width of the current block is greater than a height of the current block, the first plurality of predetermined intra prediction modes may exclude a first portion of angular prediction modes of the second plurality of predetermined intra prediction modes that have directions of reference pointing to a left edge of the current block as discussed with reference to FIGS. 5A and 5B. When the width of the current block is less than the height of the current block, the first plurality of predetermined intra prediction modes may exclude a second portion of angular prediction modes of the second plurality of predetermined intra prediction modes that have directions of reference pointing to an upper edge of the current block as discussed with reference to FIGS. 5C and 5D.

At S1060, the final predictor of the current block is generated by combining the inter predictor and the intra predictor according to one or more intra weight coefficients associated with the intra prediction mode. The one or more intra weight coefficients indicate one or more ratios that corresponding one or more portions of the intra predictor are combined with the inter predictor, respectively. In some examples, the intra-inter prediction module 312 generate the final predictor of the current block based on the one or more intra weight coefficients, provided by the decoding controller 316 or determined by the intra-inter prediction module 312, as described with reference to FIG. 3.

In some examples, combining the inter predictor and the intra predictor is performed according to an intra weight coefficient applicable to an entirety of the current block when the intra prediction mode is a non-angular prediction mode. For example, the intra weight coefficient may be set to be 0.5 for the entirety of the current block when the intra prediction mode is the DC mode or a planar mode. In this case, the inter weight coefficient for the inter predictor may be set to be 0.5.

In some examples, the current block may be divided into a predetermined number of portions when the intra prediction mode is an angular prediction mode, and combining the inter predictor and the intra predictor may be performed according to intra weight coefficients for the predetermined number of portions, respectively. For example, the values of the intra weight coefficients increase when distances between the corresponding portions and the samples of neighboring pixels along a direction of reference of the intra prediction mode decrease, as described with reference to FIG. 8.

In some examples, a closest one of predetermined representative directions to a direction of reference of the intra prediction mode may be identified when the intra prediction mode is an angular prediction mode. The current block may be divided into a predetermined number of portions arranged along the identified representative direction, as described with reference to FIGS. 6 and 7. In such example, combining the inter predictor and the intra predictor is performed according to intra weight coefficients for the predetermined number of portions, respectively, and the values of the intra weight coefficients increase when distances between the corresponding portions and the samples of neighboring pixels along the identified representative direction decrease. In some examples, the predetermined representative directions include at least a vertical direction of reference and a horizontal direction of reference.

At S1070, the current block is decoded based on the final predictor to output a decoded block. For example, the adder 342 generate a decoded block of the current block based on combining the residual portion of the current block and the final predictor from the intra-inter prediction module 312 as described with reference to FIG. 3.

After S1070, the process proceeds to S1099 and terminates.

Figure 11:
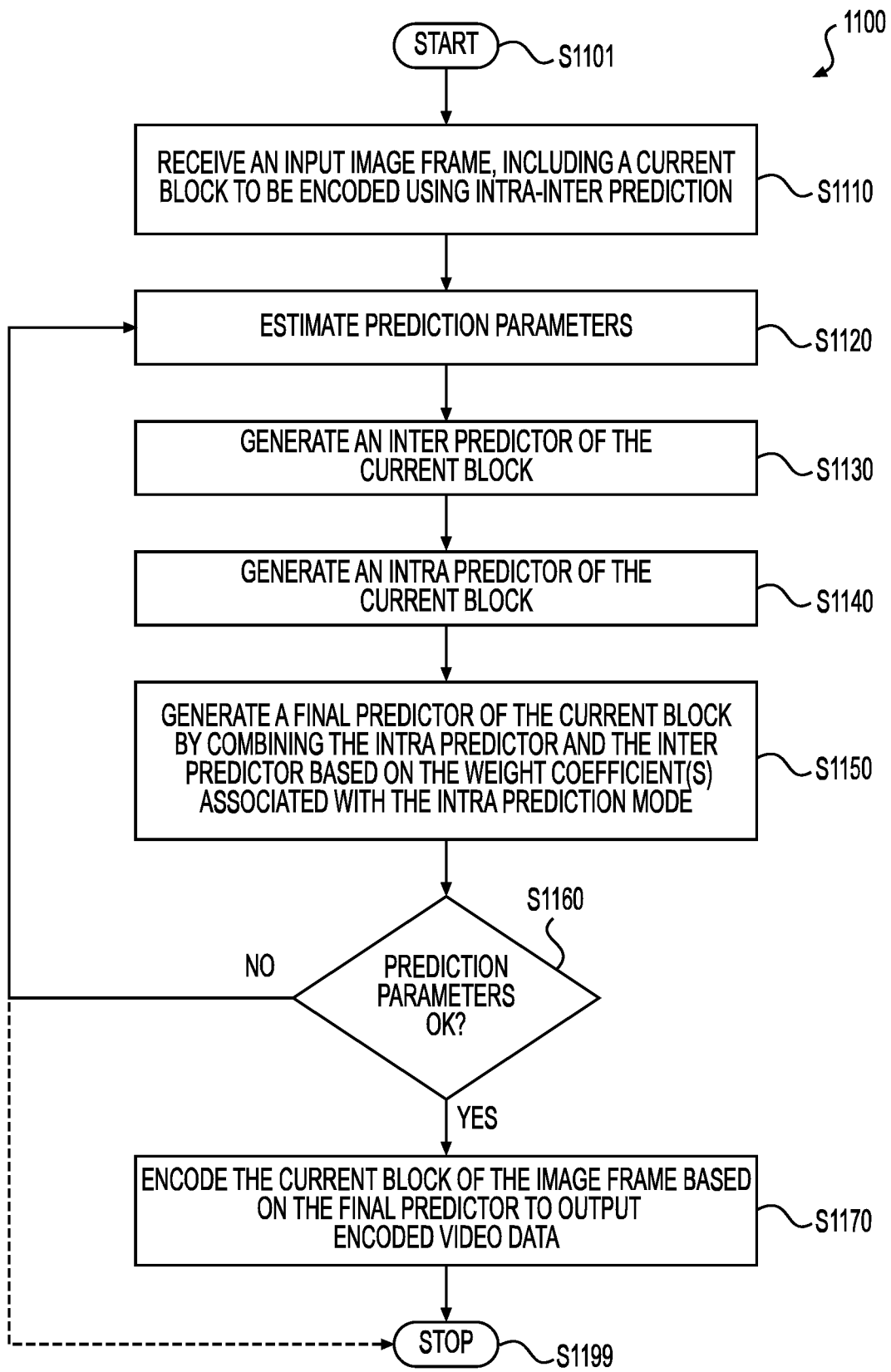
FIG. 11 shows a flow chart outlining an exemplary video encoding process using a processing circuit for video encoding, such as the processing circuit in FIG. 9, according to an embodiment of the disclosure.

FIG. 11 shows a flow chart outlining a video encoding process 1100 using a processing circuit for video encoding, such as the processing circuit 920 in FIG. 9, according to an embodiment of the disclosure. It is understood that additional operations may be performed before, during, and/or after the process 1100 depicted in FIG. 11. The process 1100 starts at S1101 and proceeds to S1110.

At S1110, an input image frame including a current block to be encoded using an intra-inter prediction is received as input data. For example, the processing circuit 920 may receive the input frames 906 that include the image frame having the current block.

At S1120, prediction parameters for encoding the current block using the intra-inter prediction are estimated. For example, the intra-inter estimation module 924, either alone or with the assistance of the inter estimation module 934 and/or the intra estimation module 938, estimates the prediction parameters for encoding the current block using the intra-inter prediction, as described with reference to FIG. 9.

As illustrated with referenced to FIG. 2, when the current block is encoded using the intra-inter prediction, a final predictor of the current block is generated based on combining an inter predictor and an intra predictor. The estimation of the prediction parameters for generating the inter predictor may be determined by determining a reference frame, a motion vector indicating a reference block in the reference frame, and/or the inter weight coefficient(s) to be used to generate the final predictor. The estimation of the prediction parameters for generating the intra predictor may be based on neighboring pixels, a selected intra prediction mode, and/or the intra weight coefficient(s) to be used to generate the final predictor.

In some examples, the intra prediction mode for the current block using the intra-inter prediction may be selected from a first plurality of predetermined intra prediction modes, and a second block may be encoded based on a intra predictor derived according to a second intra prediction mode selected from a second plurality of predetermined intra prediction modes. The first plurality of predetermined intra prediction modes may be a subset of the second plurality of predetermined intra prediction modes as discussed with reference to FIGS. 3, 9, and 10. Moreover, the intra weight coefficient(s) may be associated with the selected intra prediction mode. The assignment of the intra weight coefficient(s) may be determined as discussed with reference to FIGS. 3, 6-9, and 10.

At S1130, the inter predictor of the current block is generated based on the prediction parameters determined at S1120. For example, the intra-inter prediction module 922, either alone or with the assistance of the inter prediction module 932, generates the inter predictor of the current block based on the prediction parameters provided by the intra-inter estimation module 924 as described with reference to FIG. 9.

At S1140, the intra predictor of the current block is generated based on the prediction parameters determined at S1120. For example, the intra-inter prediction module 922, either alone or with the assistance of the intra prediction module 936, generates the intra predictor of the current block based on the prediction parameters provided by the intra-inter estimation module 924 as described with reference to FIG. 9.

At S1150, the final predictor of the current block is generated by combining the inter predictor and the intra predictor according to the weight coefficient(s). For example, the intra-inter prediction module 922 generates the final predictor of the current block based on the intra weight coefficient(s) associated with the selected intra prediction mode, either provided by the intra-inter estimation module 924 or determined by the intra-inter prediction module 922 as described with reference to FIG. 9.

At S1160, whether the prediction parameters are acceptable is determined. If the prediction parameters are acceptable, the process proceeds to S1170. If the prediction parameters are not acceptable, the process may proceed to S1120 to redo the prediction parameter estimation or to S1199 to try another type of prediction. For example, the encoding controller 926 receives the prediction parameters estimated by the intra-inter estimation module 924 and the encoded residue information from the residue encoder 944, which is generated based on the final predictor from the intra-inter prediction module 922. The encoding controller 926 may determine whether the prediction parameters and the encoded residue information are acceptable based on predetermined encoding criteria and determine whether the intra-inter estimation module would have to provide a different set of estimated prediction parameters and/or whether to use only the intra prediction or inter prediction.

At S1170, the current block is encoded based on the final predictor to output encoded video data. For example, the current block is encoded by encoding the prediction parameters from S1120 and the residue information that is generated based on subtracting the final predictor from an original image of the current block. For example, the adder 942 generates the residue information of the current block, the residue encoder 944 generates the encoded residue information, and encoding controller 926 generates the encoded video data based on the prediction parameters from the intra-inter prediction module 924 and the encoded residue information from the residue encoder as described with reference to FIG. 9.

The selection of the intra-inter prediction and various prediction parameters may be explicitly included in the encoded video data or derivable during the decoding process based on information provided in the encoded video data. In some examples, the motion vector for the intra-inter prediction may be explicitly provided in the encoded video data or determined by deriving a motion vector using an Advanced Motion Vector Prediction (AMVP), Merge, or Skip mode. In some examples, a flag indicating whether the current block is encoded using the final predictor generated based on combining the inter predictor and the intra predictor (i.e., using the intra-inter prediction) is included as a syntax elements at the block level (e.g., PU level) in the encoded video data. The flag may be bypass coded or context coded, using one, two or three contexts. In some examples, the intra-inter prediction is arranged as a special case of the inter prediction, and the flag is included in the encoded video data only if the current block is identified in the encoded video data or is identified in the input data by another flag as encoded using the inter prediction. In some examples, the intra-inter prediction is arranged as a special case of the intra prediction, and the flag is included in the encoded video data only if the current block is identified in the encoded video data or is identified in the input data by another flag as encoded using the intra prediction.

Moreover, an enable flag indicating whether the intra-inter prediction is enabled or disabled for the corresponding sequence or picture(s) may be further included as a syntax element in the SPS, PPS or any high-level property of the encoded video data.

After S1170, the process proceeds to S1199 and terminates.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method of video decoding, comprising:
receiving a bitstream that includes coded data to be decoded as a current block in an image frame;
obtaining an enable flag that is included in a Sequence Parameter Set (SPS) or a Picture Parameter Set (PPS) of the bitstream, the enable flag indicating whether intra-inter prediction functionality is enabled for a corresponding sequence or a corresponding picture that includes the current block;
when the enable flag indicates that the intra-inter prediction functionality is enabled for the corresponding sequence or the corresponding picture that includes the current block, determining, as a special case of an inter prediction, whether the current block is coded according to an intra-inter prediction; and
when the current block is deteirtined to be coded according to the intra-inter prediction:
generating an inter predictor of the current block;
generating an intra predictor of the current block based on samples of neighboring pixels and an intra prediction mode for the current block that locates the samples of neighboring pixels, the intra prediction mode for the current block being a Planar mode or a DC mode;
determining an intra weight coefficient according to intra information of a previously coded block regardless of the intra prediction mode for the current block, the intra weight coefficient being the same for all samples of the current block;
generating a final predictor of the current block by combining the inter predictor and the intra predictor according to the intra weight coefficient, wherein the intra weight coefficient indicates a weight of the intra predictor in the final predictor; and
reconstructing the current block for output based on the final predictor.

2. The method according to claim 1, wherein the current block is a chroma block.

3. A video decoding apparatus, comprising:
a processing circuit configured to:
receive a bitstream that includes coded data to be decoded as a current block in an image frame;
obtain an enable flag that is included in a Sequence Parameter Set (SPS) or a Picture Parameter Set (PPS) of the bitstream, the enable flag indicating whether intra-inter prediction functionality is enabled for a corresponding sequence or a corresponding picture that includes the current block;
when the enable flag indicates that the intra-inter prediction functionality is enabled for the corresponding sequence or the corresponding picture that includes the current block, determine, as a special case of an inter prediction, whether the current block is coded according to an intra-inter prediction; and
when the current block is determined to be coded according to the intra-inter prediction:
generate an inter predictor of the current block;
generate an intra predictor of the current block based on samples of neighboring pixels and an intra prediction mode for the current block that locates the samples of neighboring pixels, the intra prediction mode for the current block being a Planar mode or a DC mode;
determine an intra weight coefficient according to intra information of a previously coded block regardless of the intra prediction mode for the current block, the intra weight coefficient being the same for all samples of the current block;

generate a final predictor of the current block by combining the inter predictor and the intra predictor according to the intra weight coefficient, wherein the intra weight coefficient indicates a weight of the intra predictor in the final predictor; and reconstruct the current block for output based on the final predictor.

4. The method according to claim 1, wherein the determining whether the current block is coded according to the intra-inter prediction comprises determining that the current block is not coded according to the intra-inter prediction in response to a size of the current block being determined as equal to or less than a threshold.

5. The method according to claim 1, wherein the inter predictor is generated by deriving a motion vector using a Merge mode.

6. The method according to claim 1, wherein the intra weight coefficient is 0.5.

7. The video coding apparatus according to claim 3, wherein the processing circuit is configured to determine that the current block is not coded according to the intra-inter prediction in response to a size of the current block being determined as equal to or less than a threshold.

8. The video coding apparatus according to claim 3, wherein the inter predictor is generated by deriving a motion vector using a Merge mode.

9. The video coding apparatus according to claim 3, wherein the intra weight coefficient is 0.5.

10. A method of video encoding, comprising:
receiving input data associated with a current block in an image frame;
determining, as a special case of an inter prediction, whether the current block is to be coded according to an intra-inter prediction;
when the current block is determined to be coded according to the intra-inter prediction:
generating an inter predictor of the current block;
generating an intra predictor of the current block based on samples of neighboring pixels and an intra prediction mode for the current block that locates the samples of neighboring pixels, the intra prediction mode for the current block being a Planar mode or a DC mode;
determining an intra weight coefficient according to intra information of a previously coded block regardless of the intra prediction mode for the current block, the intra weight coefficient being the same for all samples of the current block;
generating a final predictor of the current block by combining the inter predictor and the intra predictor according to the intra weight coefficient, wherein the intra weight coefficient indicates a weight of the intra predictor in the final predictor;
encoding the current block based on the final predictor to obtain encoded data; and
including the encoded data in a bitstream; and
including an enable flag in a Sequence Parameter Set (SPS) or a Picture Parameter Set (PPS) of the bitstream, and the enable flag indicating whether intra-inter prediction functionality is enabled for a corresponding sequence or a corresponding picture that includes the current block.

11. The method according to claim 10, wherein the determining whether the current block is coded according to the intra-inter prediction comprises determining that the current block is not coded according to the intra-inter prediction in response to a size of the current block being determined as equal to or less than a threshold.

12. The method according to claim 10, wherein the inter predictor is generated by deriving a motion vector using a Merge mode.

13. The method according to claim 10, wherein the intra weight coefficient is 0.5.

* * * * *